United States Patent
Beer et al.

(10) Patent No.: US 9,598,245 B2
(45) Date of Patent: Mar. 21, 2017

(54) METHOD AND DEVICE FOR HORIZONTALLY TRANSFERRING LAYERS OF ARTICLES BETWEEN ADJACENT MODULES

(71) Applicant: Krones AG, Neutraubling (DE)

(72) Inventors: Erhard Beer, Ebbs (AT); Martin Osterhammer, Frasdorf (DE); Johann Haas, Schechen/Pfaffenhofen (DE); Florian Hertel, Raubling (DE)

(73) Assignee: KRONES AG, Neutraubling (DE)

( * ) Notice: Subject to any disclaimer, the term of this patent is extended or adjusted under 35 U.S.C. 154(b) by 57 days.

(21) Appl. No.: 14/384,795

(22) PCT Filed: Mar. 4, 2013

(86) PCT No.: PCT/EP2013/054266
§ 371 (c)(1),
(2) Date: Sep. 12, 2014

(87) PCT Pub. No.: WO2013/135513
PCT Pub. Date: Sep. 19, 2013

(65) Prior Publication Data
US 2015/0063971 A1 Mar. 5, 2015

(30) Foreign Application Priority Data

Mar. 14, 2012 (DE) .................. 10 2012 204 027

(51) Int. Cl.
*B65G 47/08* (2006.01)
*B65G 47/04* (2006.01)
(Continued)

(52) U.S. Cl.
CPC ............ *B65G 47/845* (2013.01); *B65B 35/44* (2013.01); *B65G 47/084* (2013.01); *B65G 57/24* (2013.01); *B65B 35/405* (2013.01)

(58) Field of Classification Search
CPC .......... B65G 47/841; B65G 2201/0244; B65G 47/088; B65G 47/082; B65G 47/08;
(Continued)

(56) References Cited

U.S. PATENT DOCUMENTS 2,949,179 A * 8/1960 Busse .................. B65G 47/088
198/418.1
3,978,970 A * 9/1976 Reimers .................. A23L 3/001
198/429
(Continued)

FOREIGN PATENT DOCUMENTS

CN 1799957 A 7/2006
CN 202054150 U 11/2011
(Continued)

OTHER PUBLICATIONS

German Search Report for DE 10 2012 204 027.7 dated Oct. 4, 2012.
(Continued)

*Primary Examiner* — Gregory Adams
(74) *Attorney, Agent, or Firm* — Dennemeyer & Associates, LLC

(57) ABSTRACT

The invention comprises a transfer unit (34) for horizontal movement of a group or layer of articles (10) between at least two adjacent modules (12, 14, 30) while substantially maintaining the relative positions of a plurality of articles (16) constituting the group or layer of articles (10). The transfer unit (34) comprises a horizontal support surface (24) for the layer of articles (10), at least one first bar (46) or push bar for horizontally moving the layer of articles (10) that contacts the rear of the group or layer of articles in the direction of transport or feed to an adjacent module (14, 30) and at least one second bar (40) or support bar contacting the front of the layer of articles (10), the movements of which are at least temporarily coupled with the push bar or first bar
(Continued)

(20) in the direction of transfer (20), A first horizontal section of the movement of the first bar (46) or push bar, to generate the horizontal pushing movement at the level of the layer of articles (10) moving on the support surface (24) is longer than a second horizontal section of the movement of the second bar (40) or support bar to generate the horizontal supporting movement for the layer of articles (10).

10 Claims, 19 Drawing Sheets

(51) Int. Cl.
*B65G 47/84* (2006.01)
*B65B 35/44* (2006.01)
*B65G 57/24* (2006.01)
*B65B 35/40* (2006.01)

(58) Field of Classification Search
CPC .... B65G 47/086; B65G 57/005; B65G 57/14; Y10S 414/12; B65B 21/06
USPC ........ 198/419.1, 469.1, 725, 728; 414/791.4, 414/791.7, 792.6, 794.7, 799; 53/531
See application file for complete search history.

(56) References Cited

U.S. PATENT DOCUMENTS

| 4,055,257 | A | * | 10/1977 | Krebs | ........................ | B31B 1/98 |
| | | | | | | 198/469.1 |
| 4,205,934 | A | * | 6/1980 | Pantin | .................... | B65G 57/24 |
| | | | | | | 414/793.5 |
| 4,255,074 | A | * | 3/1981 | Meratti | ................ | B65G 57/245 |
| | | | | | | 198/614 |
| 4,828,101 | A | * | 5/1989 | Fluck | ................... | B65G 47/082 |
| | | | | | | 198/418.7 |
| 4,934,509 | A | | 6/1990 | Gilgien | | |
| 5,358,232 | A | * | 10/1994 | Arendes | ................. | B65H 31/06 |
| | | | | | | 271/181 |
| 5,393,196 | A | | 2/1995 | Bluemle | | |
| 5,515,667 | A | * | 5/1996 | Roosli | .................... | B65H 31/06 |
| | | | | | | 53/157 |
| 6,585,262 | B2 | * | 7/2003 | Nakanishi | .............. | B65G 47/29 |
| | | | | | | 198/460.1 |
| 6,698,576 | B2 | | 3/2004 | Hähnel et al. | | |
| 6,953,113 | B2 | | 10/2005 | Iwasa et al. | | |
| 7,543,424 | B2 | * | 6/2009 | Lechner | ................. | B65G 17/26 |
| | | | | | | 198/792 |
| 7,828,507 | B2 | * | 11/2010 | Honegger | .......... | B65H 31/3081 |
| | | | | | | 414/788.9 |
| 2005/0121289 | A1 | | 6/2005 | Peterman et al. | | |
| 2009/0148266 | A1 | * | 6/2009 | Baumann | .............. | B65G 59/023 |
| | | | | | | 414/796.2 |
| 2010/0089721 | A1 | * | 4/2010 | Aronsson | ............. | B65G 47/841 |
| | | | | | | 198/418.7 |
| 2011/0005898 | A1 | * | 1/2011 | Pundsack | ............... | B65G 17/26 |
| | | | | | | 198/429 |

FOREIGN PATENT DOCUMENTS

| DE | 3048656 A1 | 7/1982 | | |
| DE | 4117434 A1 | 12/1992 | | |
| DE | 4207725 A1 | 9/1993 | | |
| DE | 4435981 A1 | 4/1996 | | |
| DE | 100 48 007 A1 | 4/2002 | | |
| DE | 60307332 T2 | 4/2007 | | |
| EP | 1 493 693 B2 | 1/2005 | | |
| FR | 2259750 A1 | 8/1975 | | |
| WO | 2010096111 A1 | 8/2010 | | |
| WO | WO 2010096111 A1 | * | 8/2010 | .......... B65B 35/405 |
| WO | 2010100545 A2 | 9/2010 | | |

OTHER PUBLICATIONS

International Search Report for PCT/EP2013/054266 dated Jun. 18, 2013.
International Preliminary Report on Patentability for PCT/EP2013/054266 dated Sep. 25, 2014.
Chinese Office Action for 201380014407.3 dated Sep. 25, 2015.
Third Party Observation submitted Jul. 1, 2016.

* cited by examiner

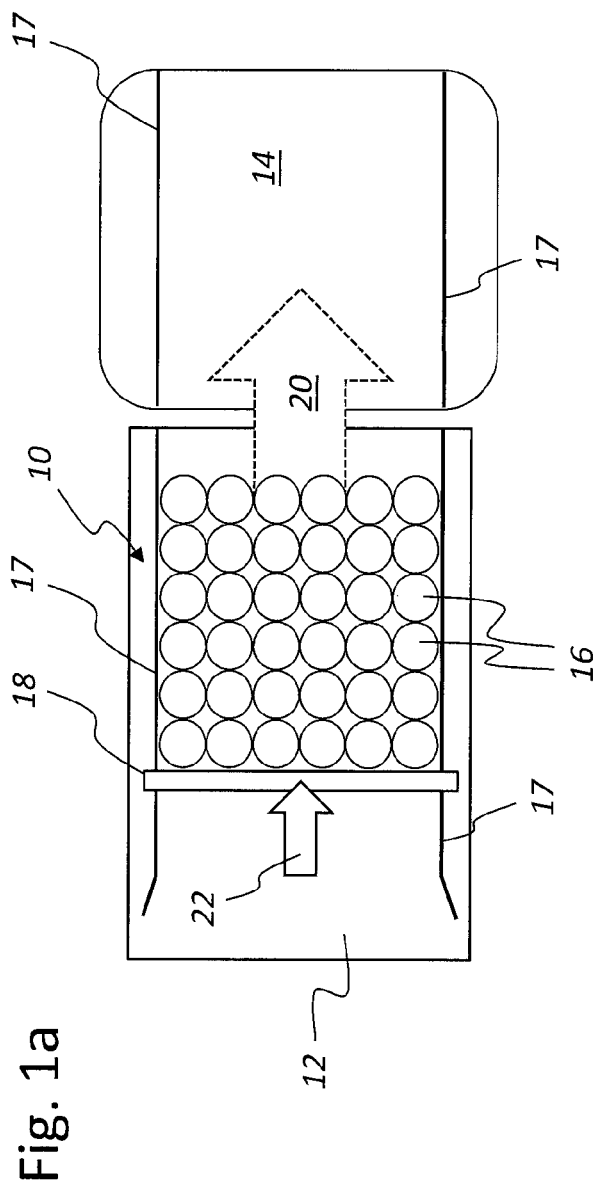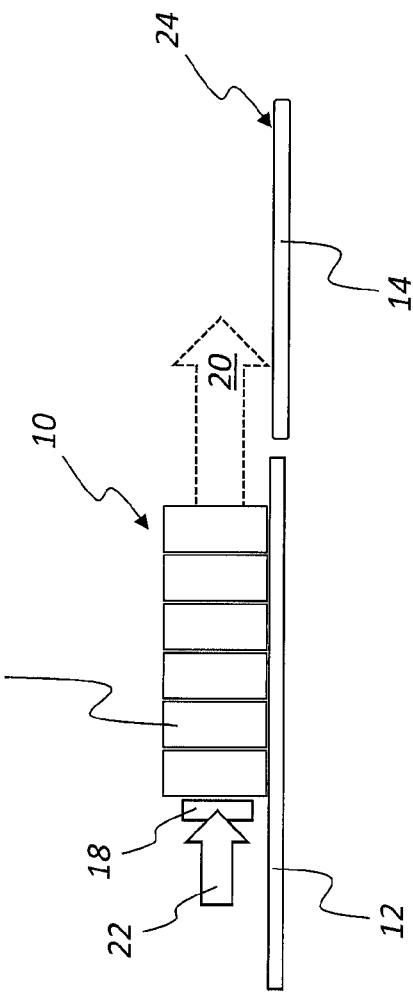
Fig. 1a
Fig. 1b

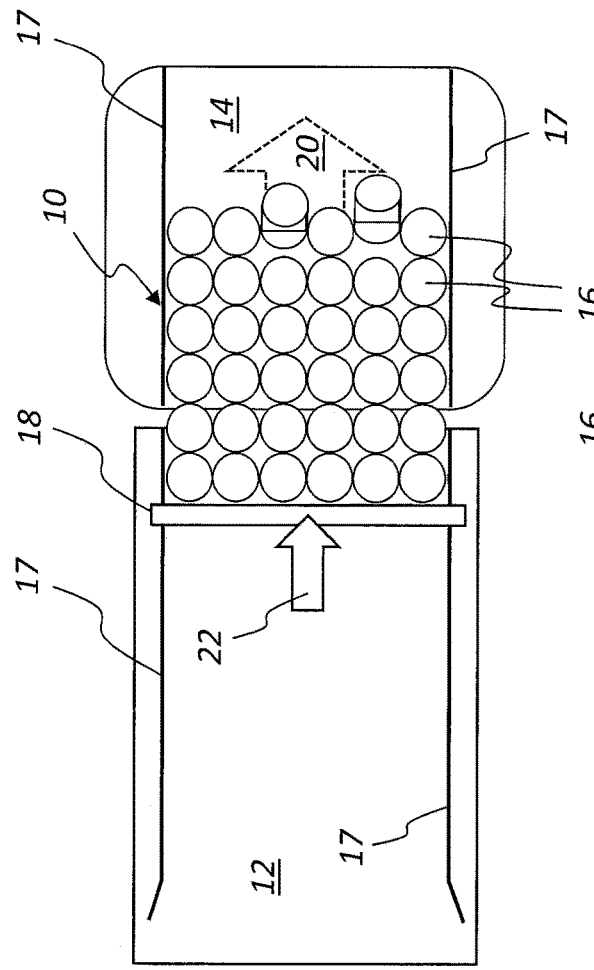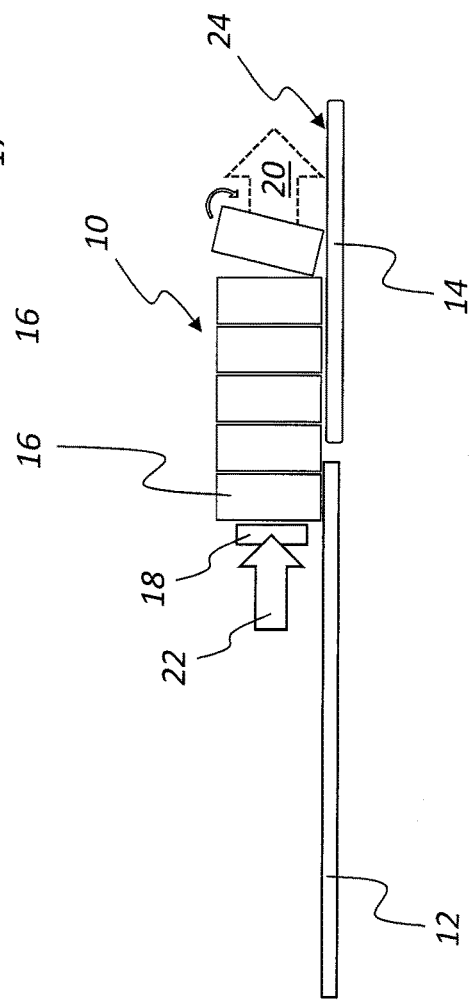
Fig. 2a
Fig. 2b

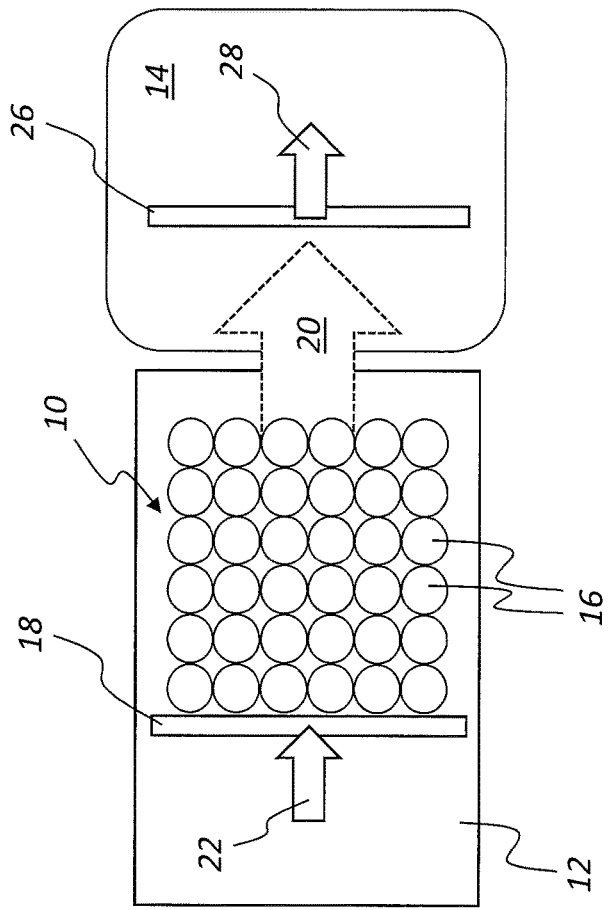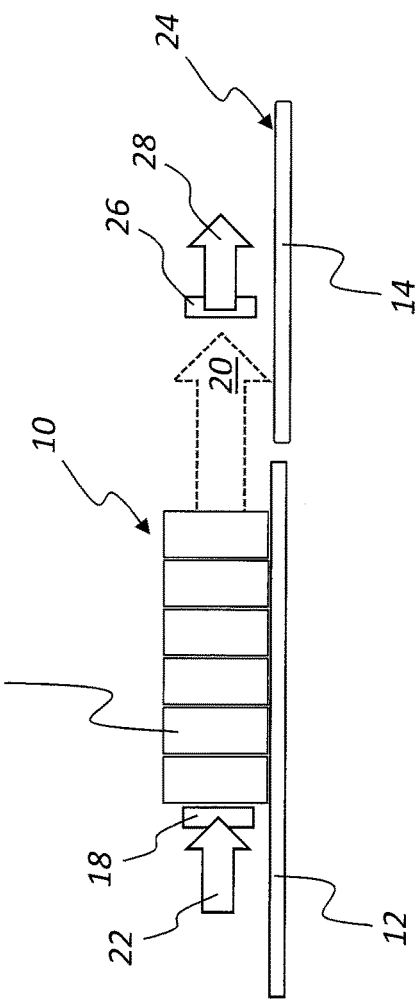
Fig. 3a
Fig. 3b

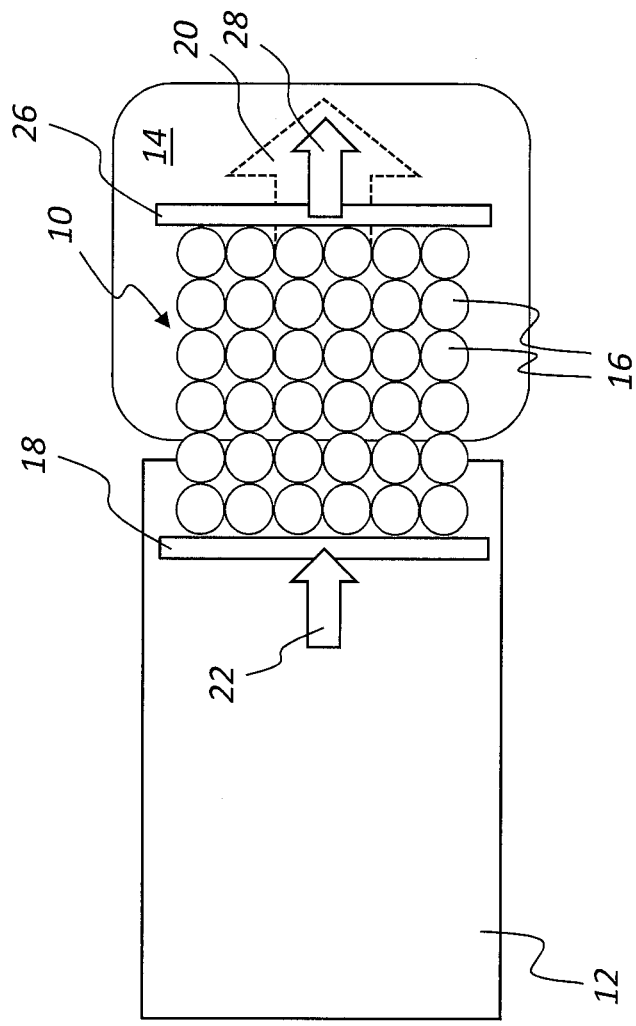
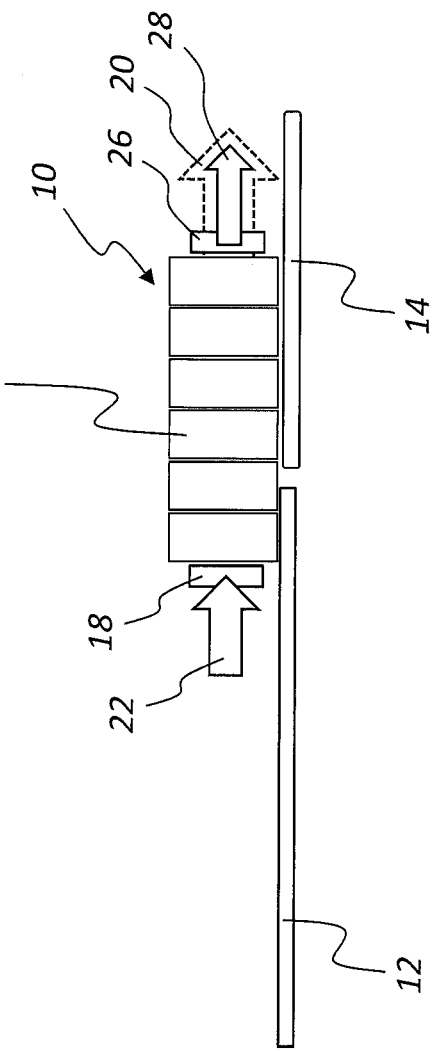
Fig. 4a
Fig. 4b

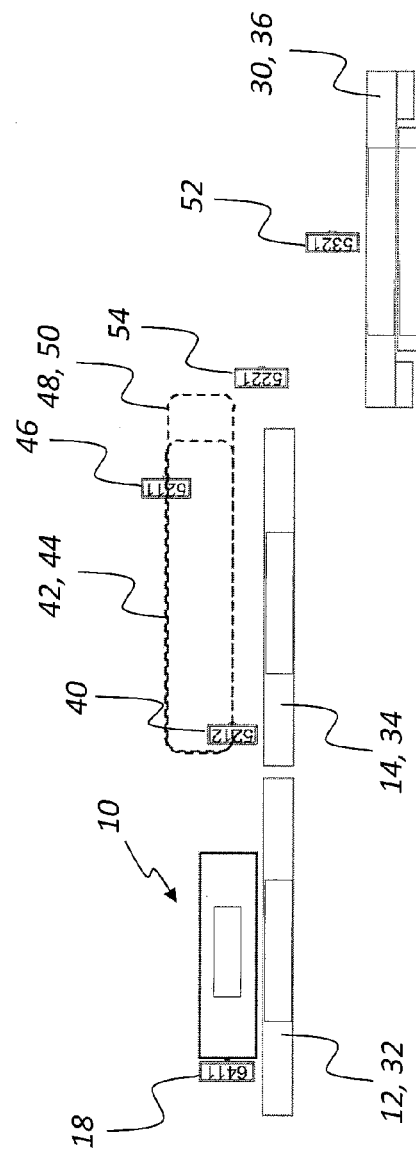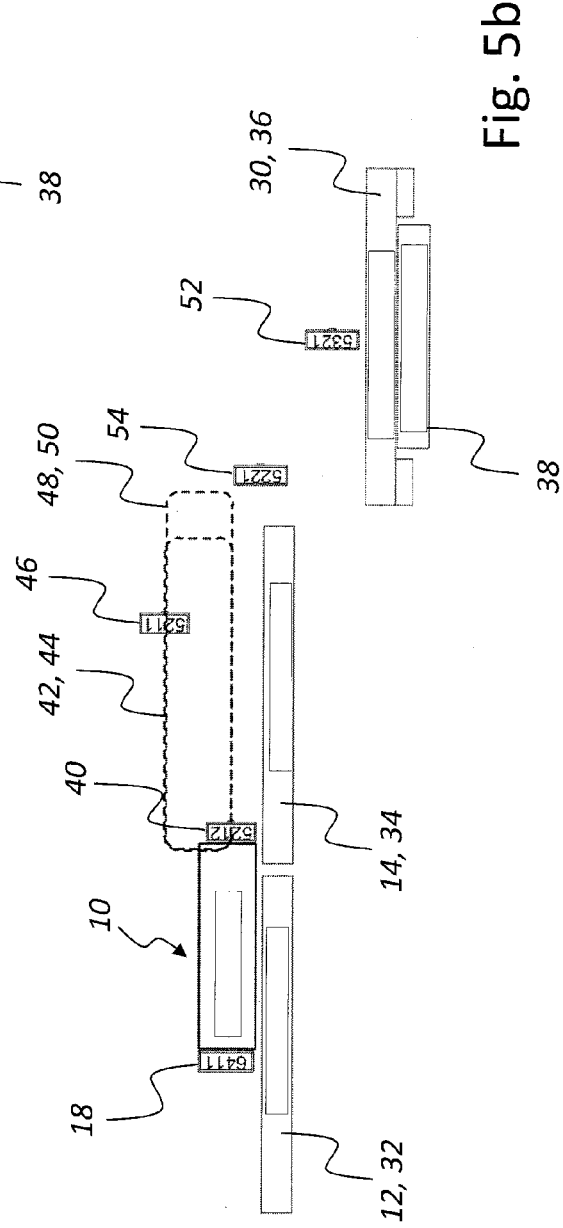

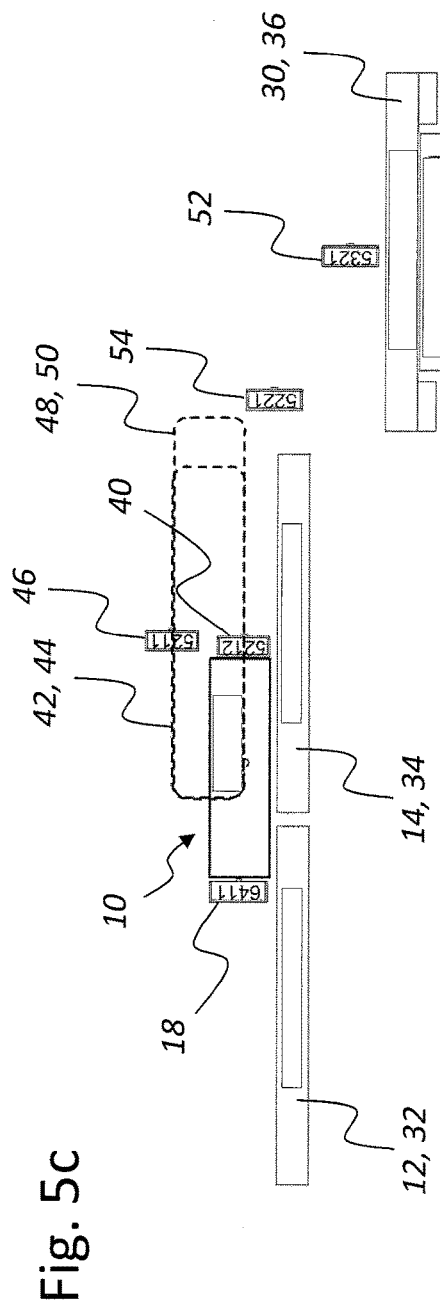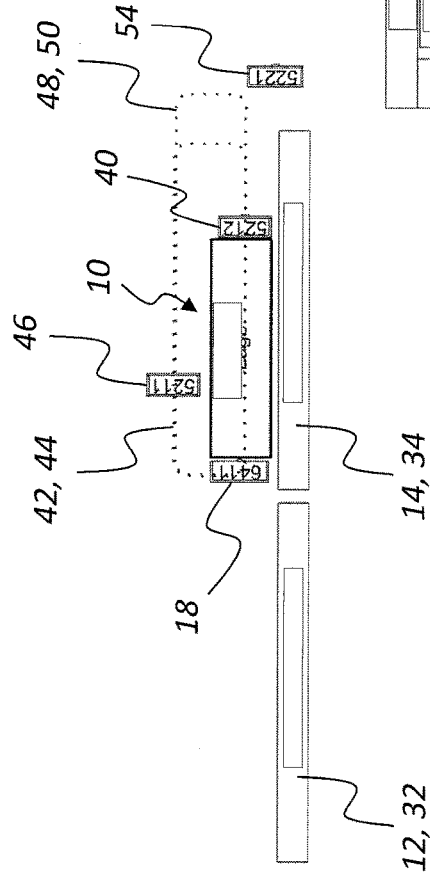

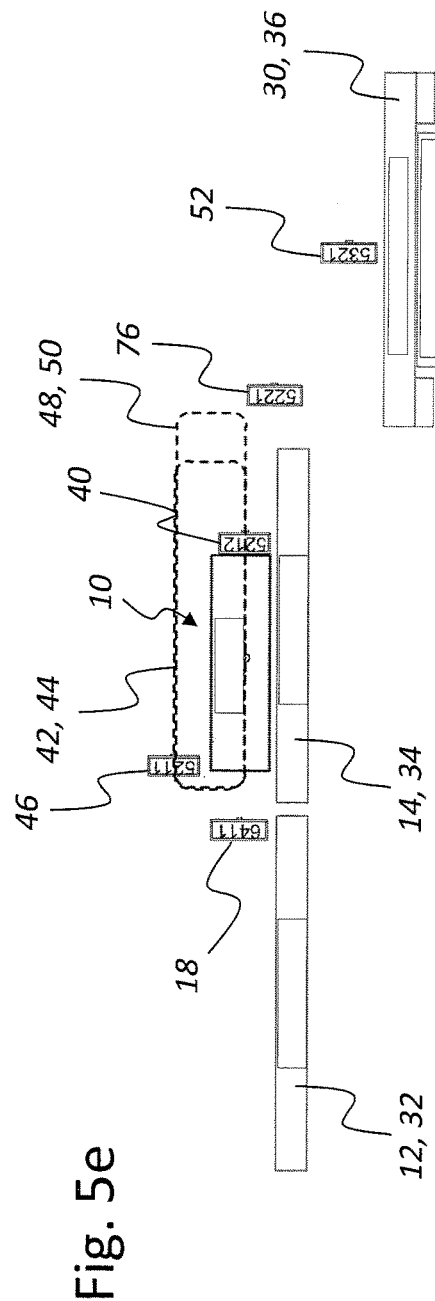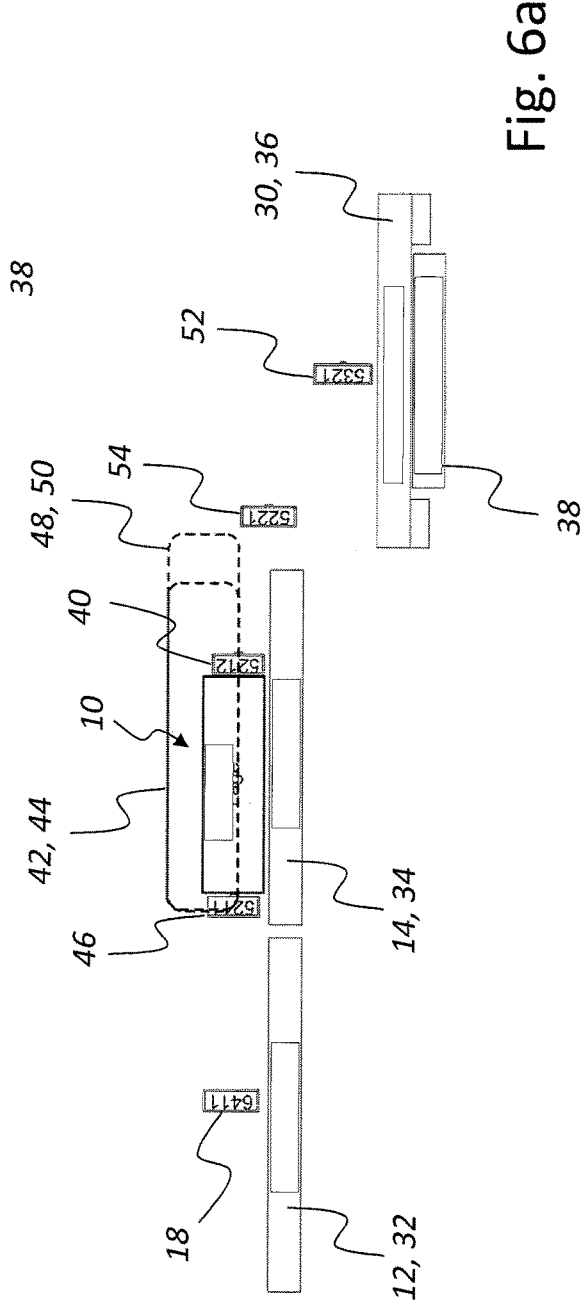

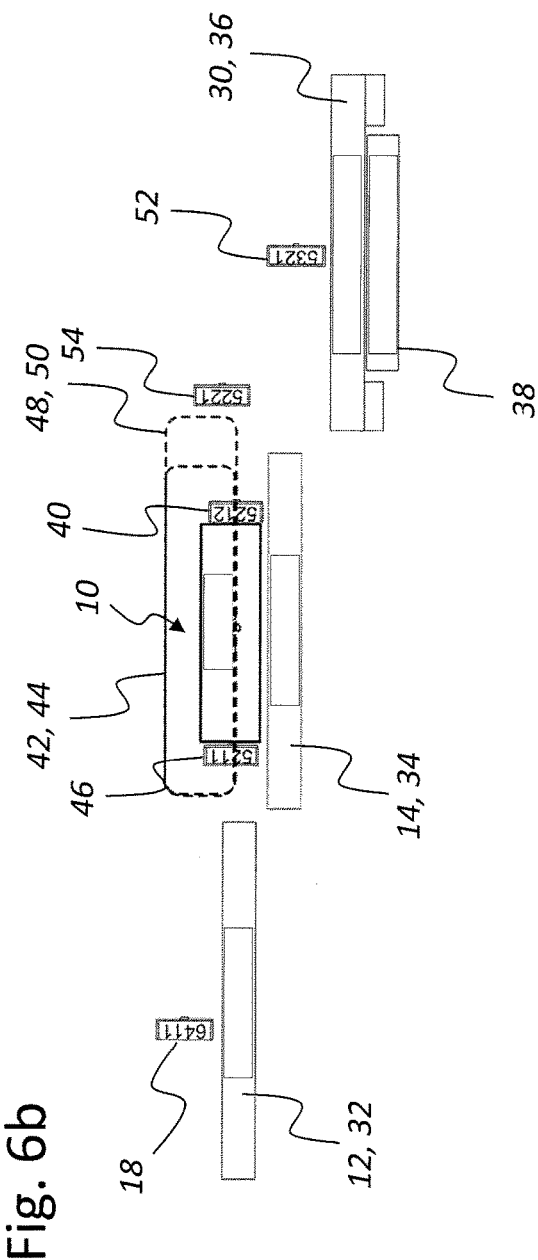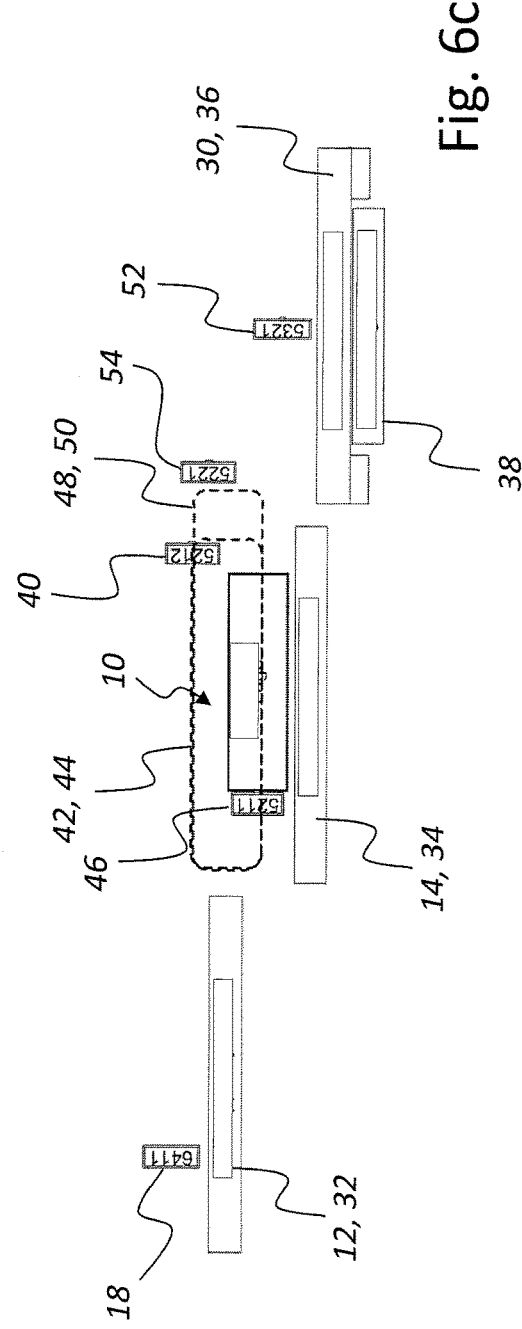

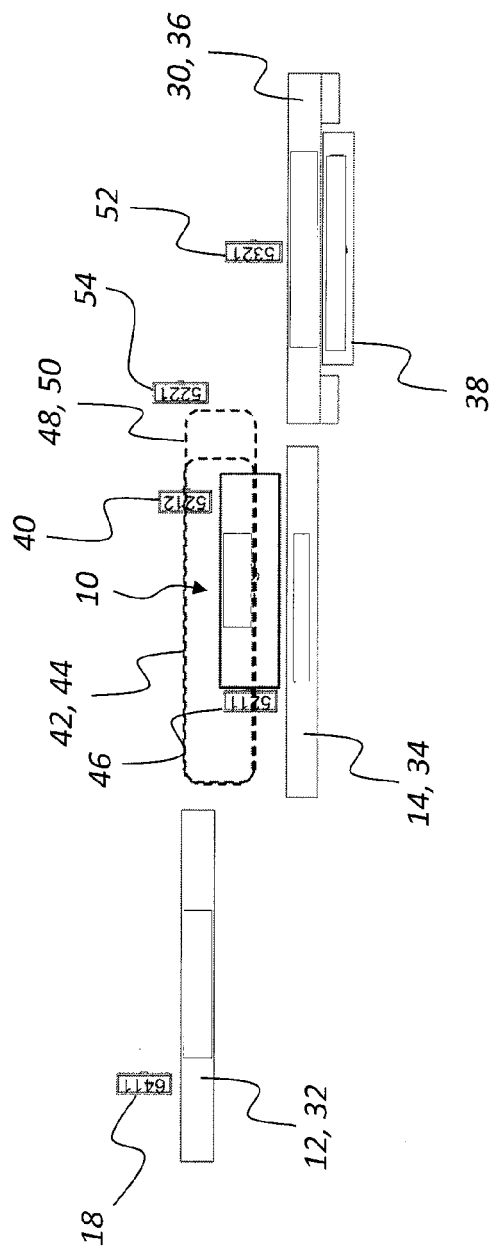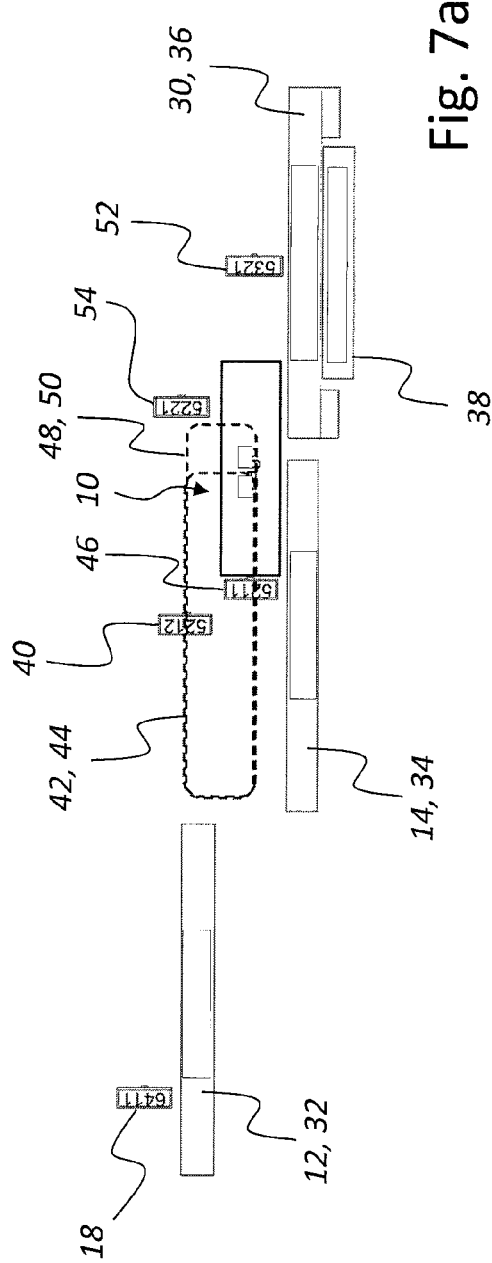

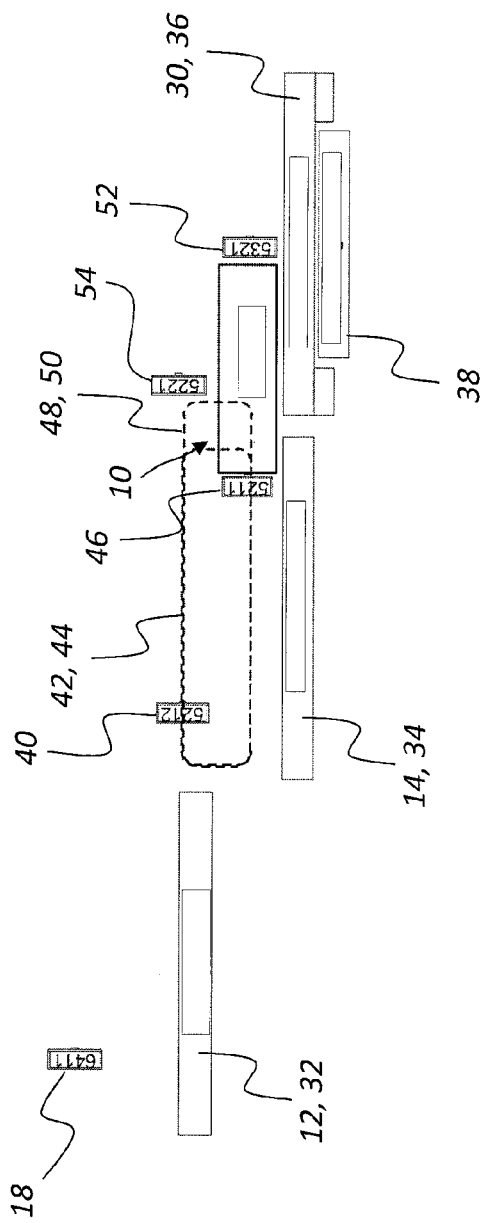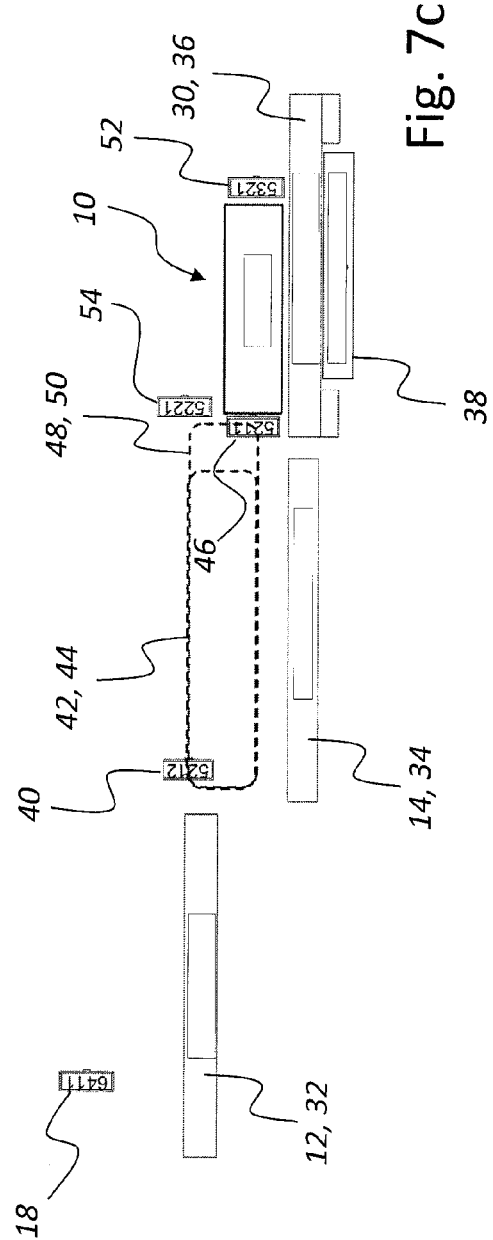

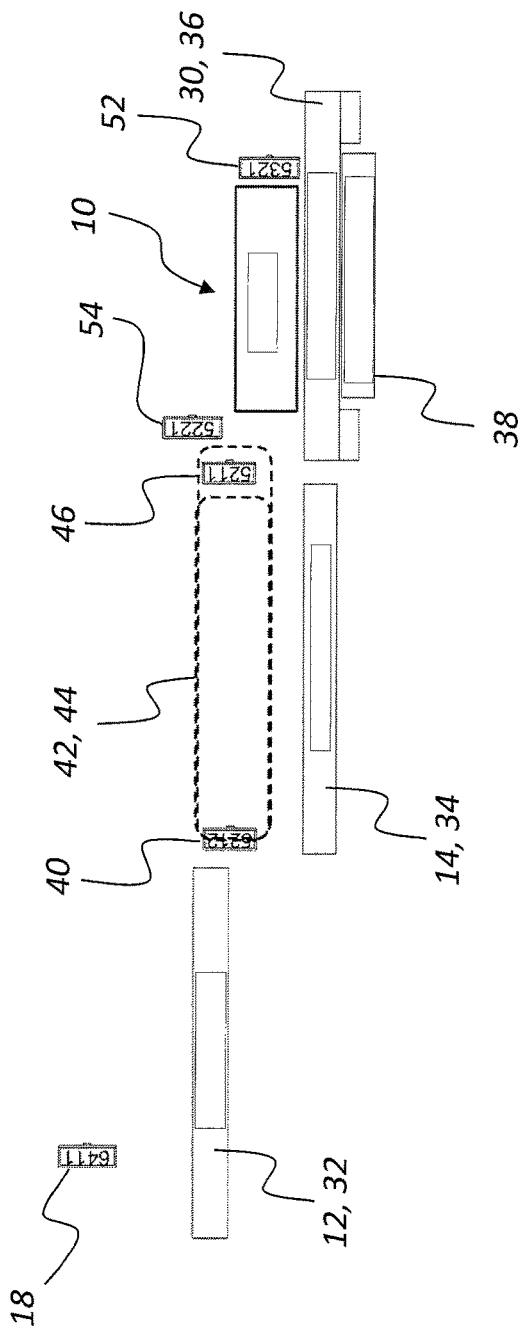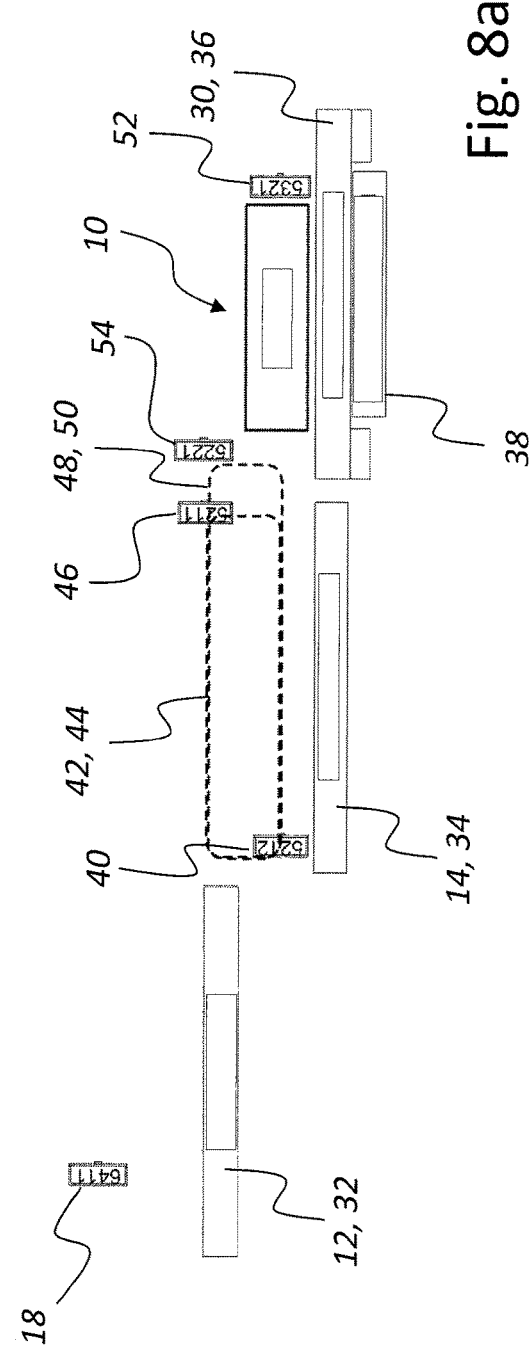

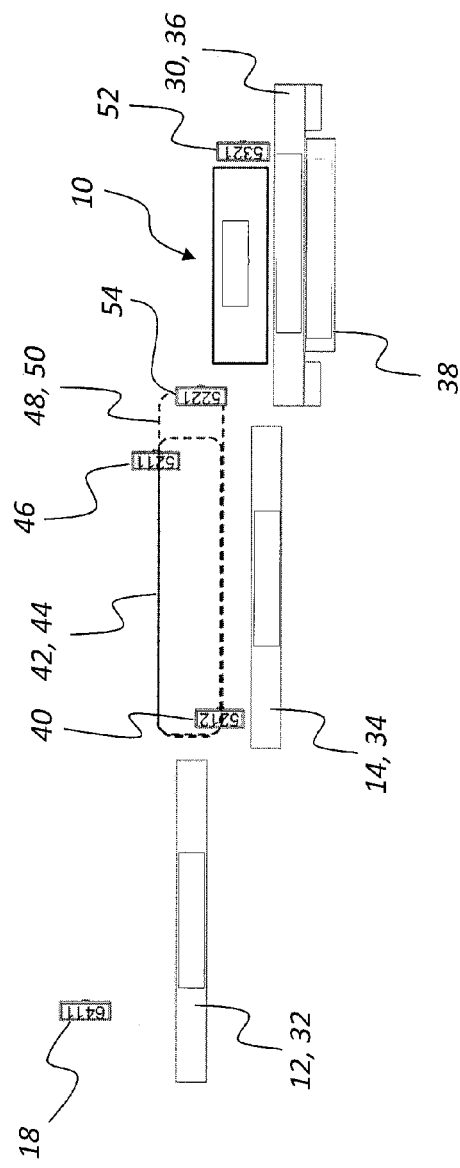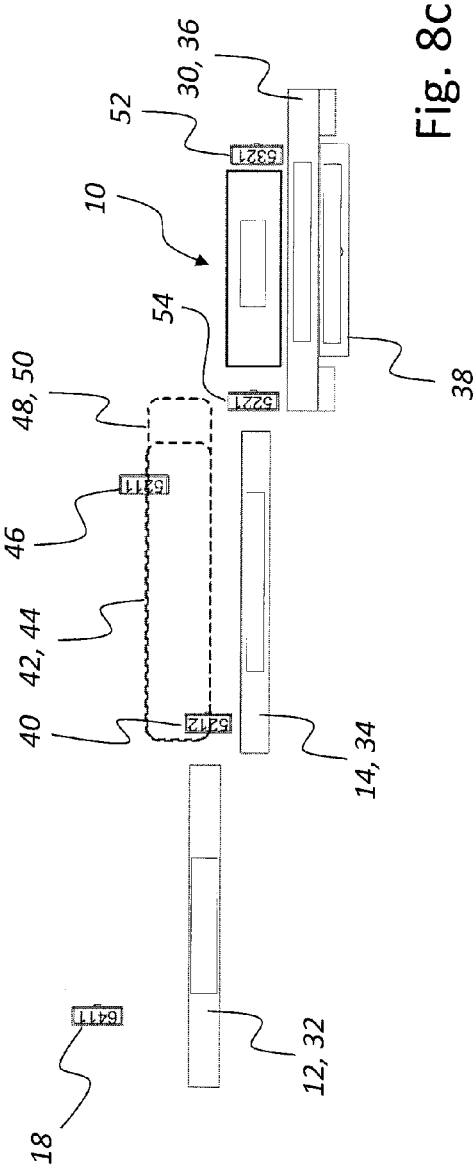

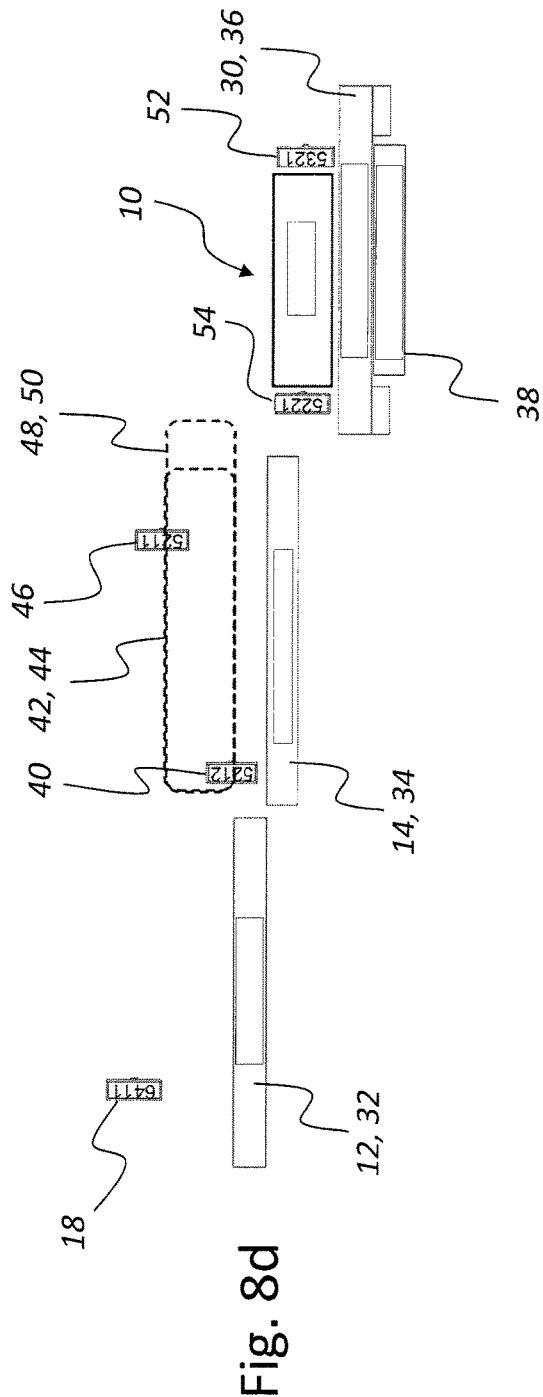
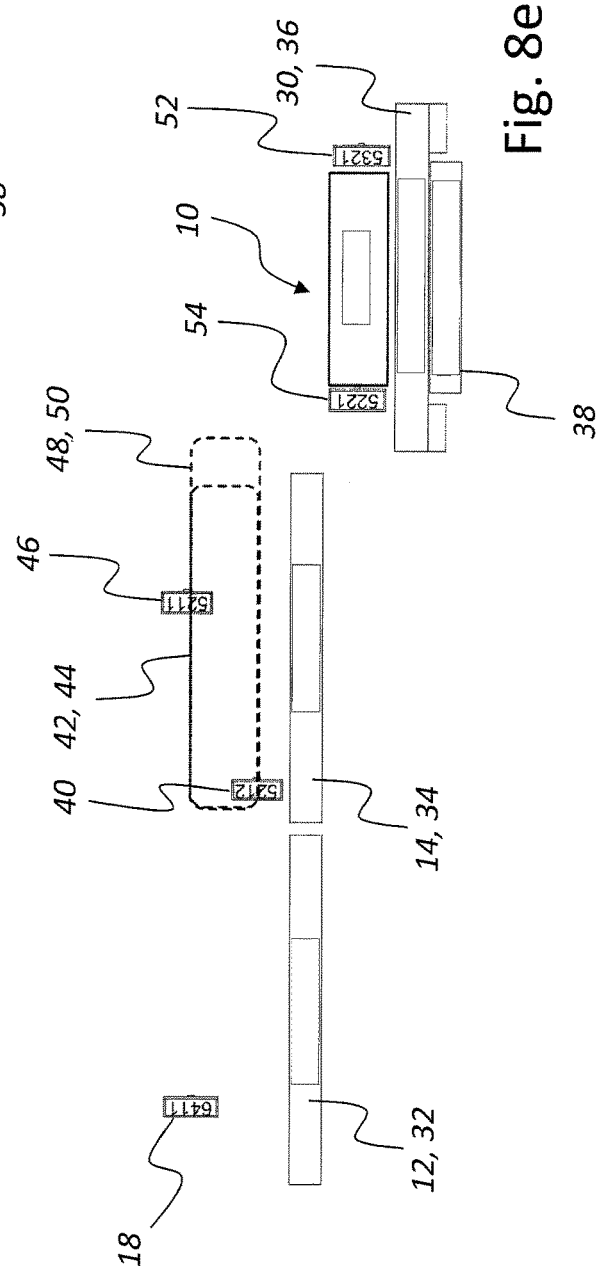
Fig. 8d
Fig. 8e

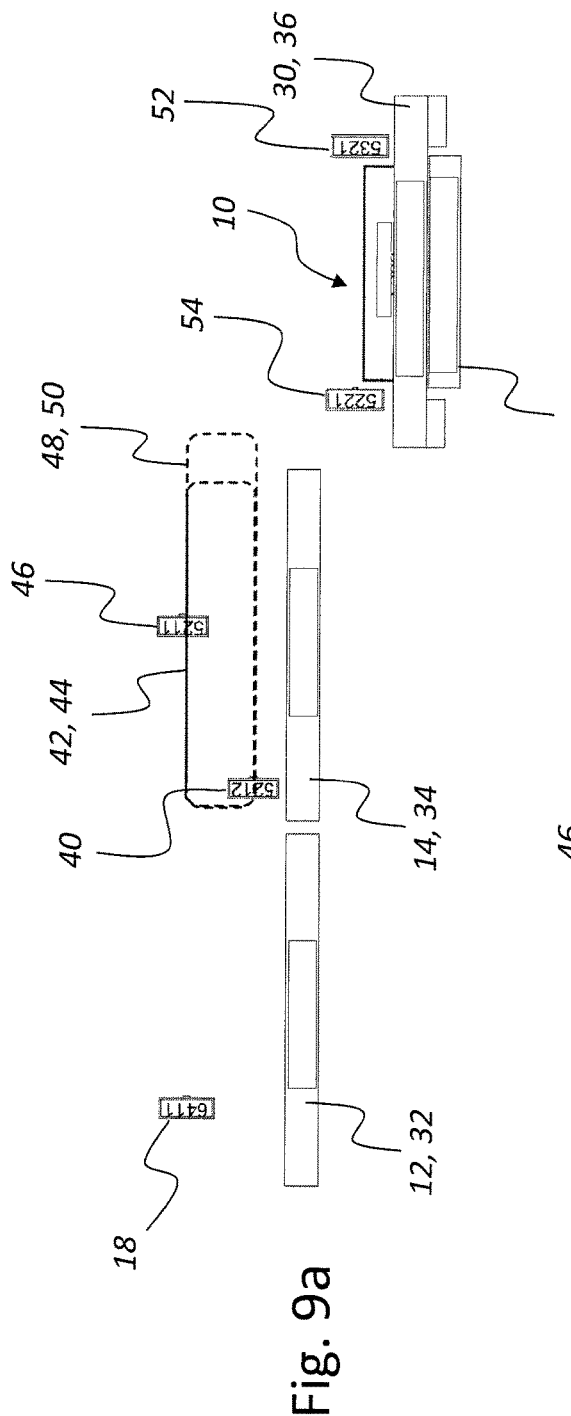
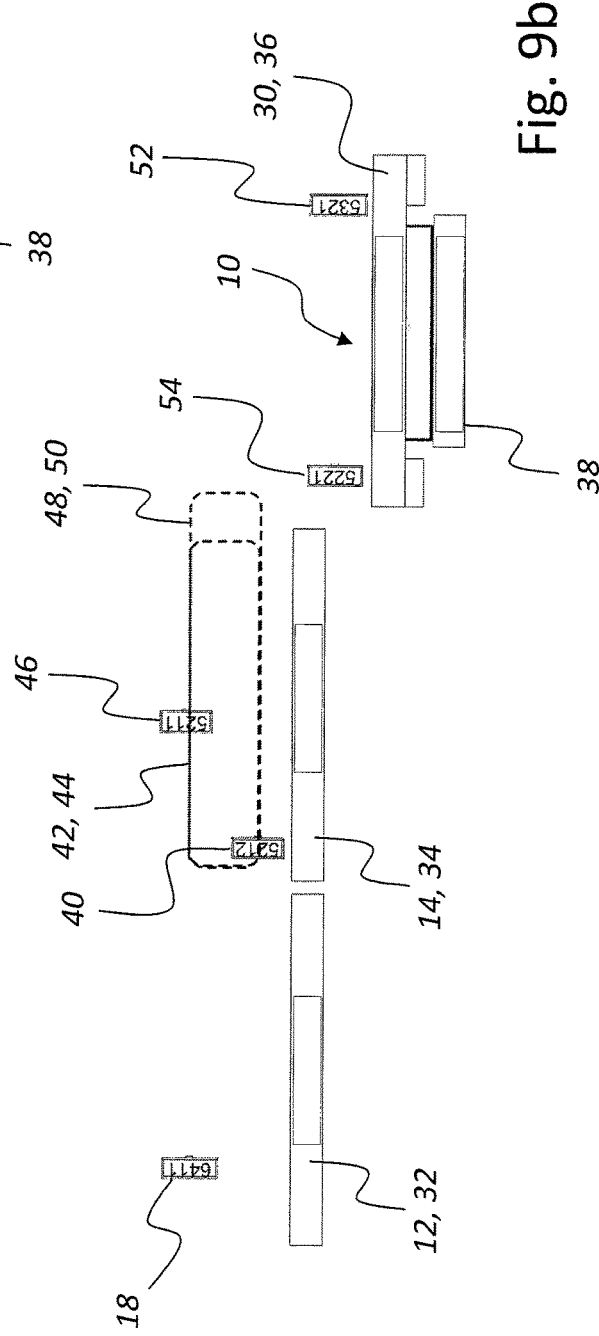
Fig. 9a
Fig. 9b

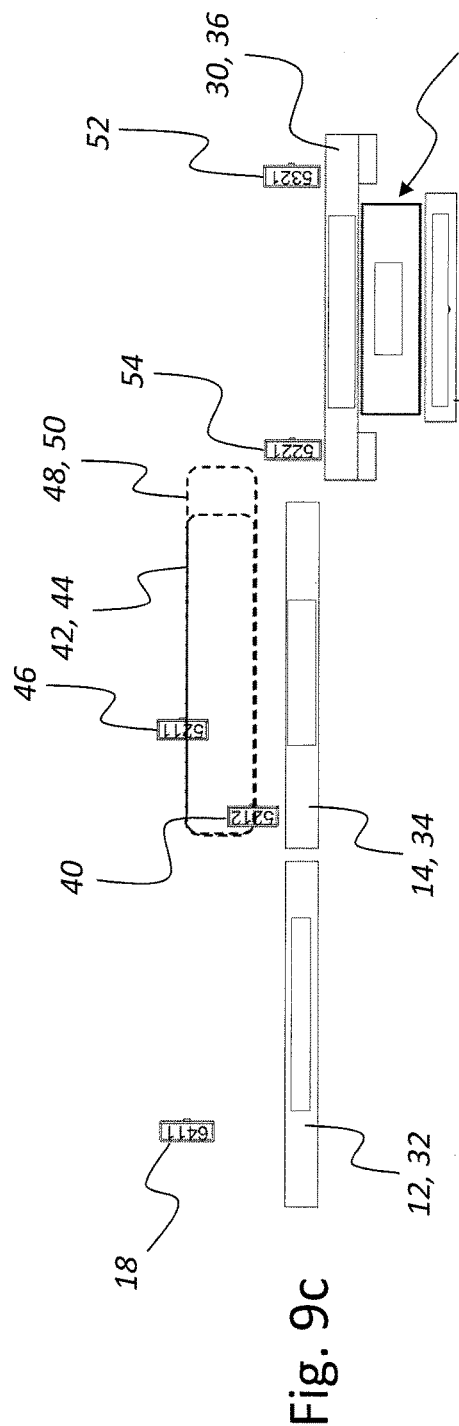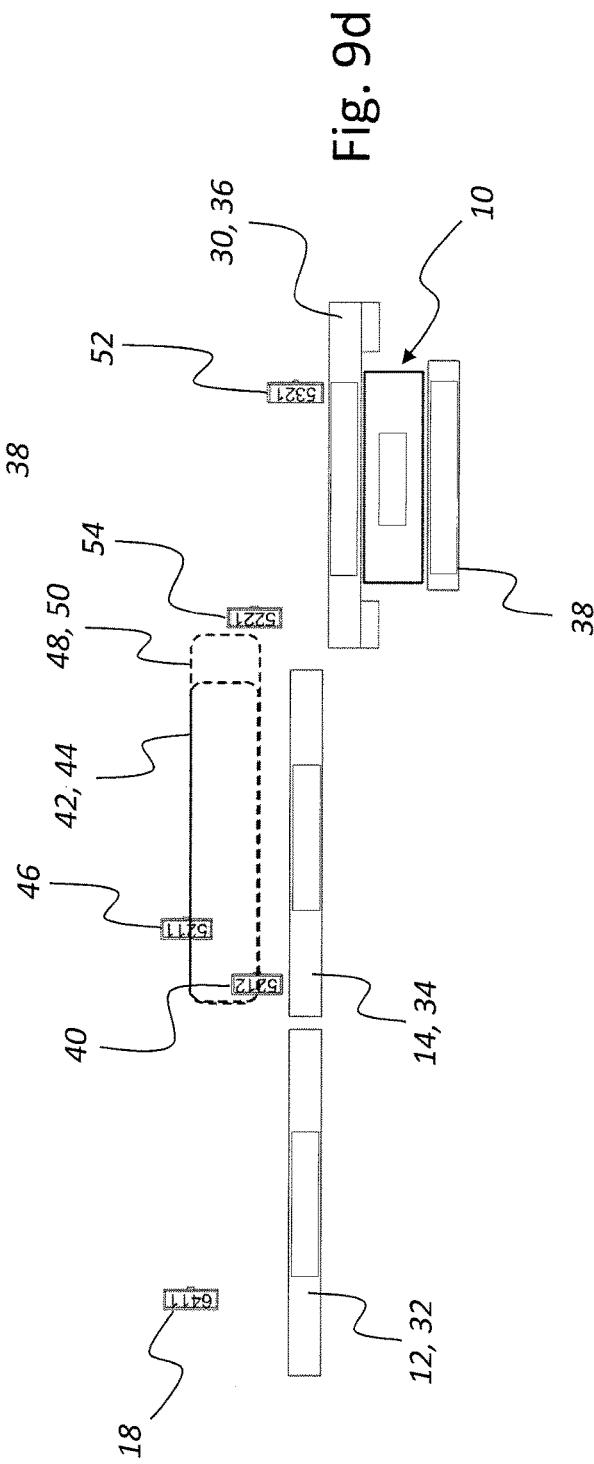

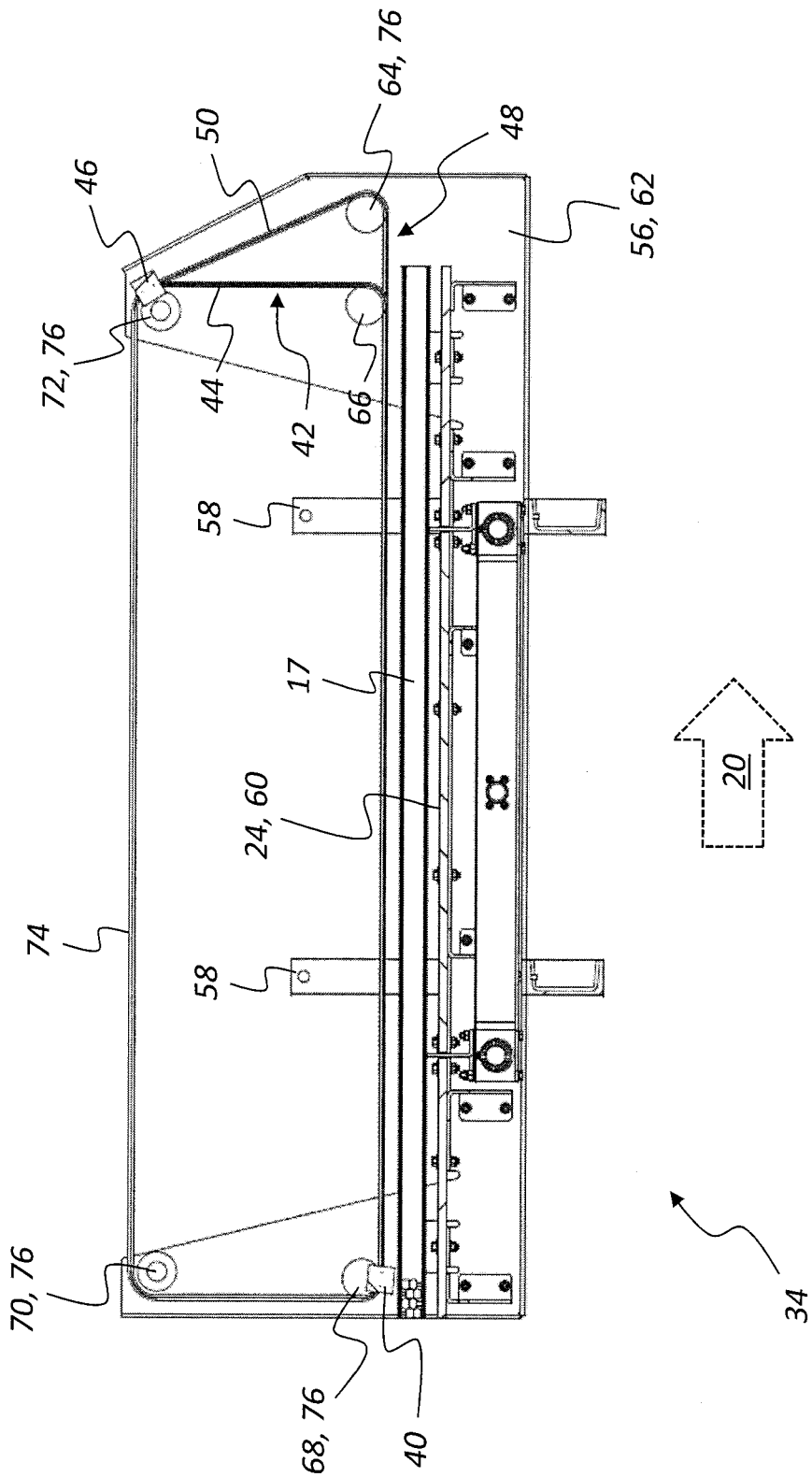

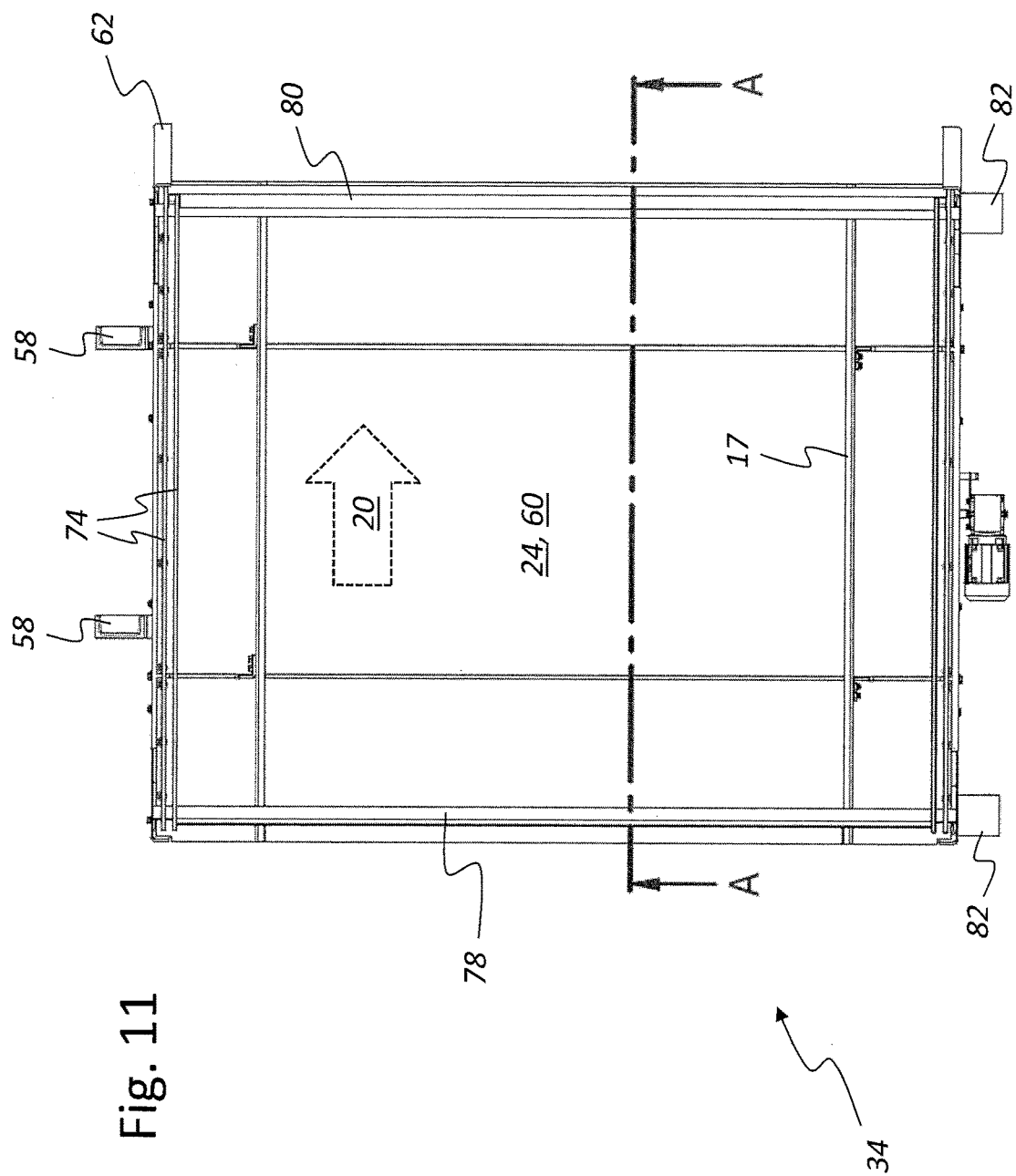

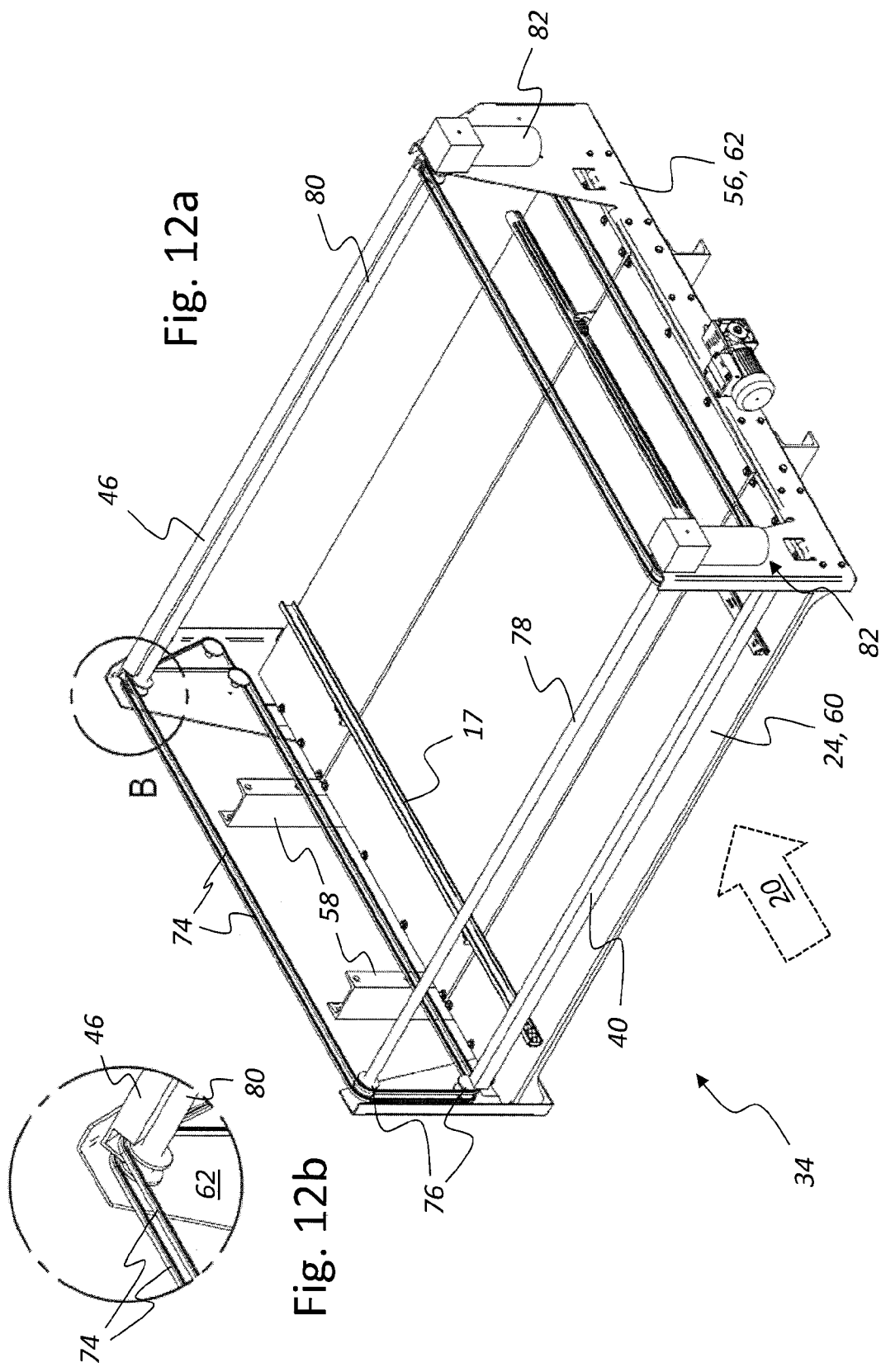

METHOD AND DEVICE FOR HORIZONTALLY TRANSFERRING LAYERS OF ARTICLES BETWEEN ADJACENT MODULES

The present invention concerns a transfer unit for horizontal movement of a group or layer of articles between at least two adjacent modules whilst substantially maintaining the relative positions of a plurality of articles constituting the group or layer of articles relative to one another, having the characteristics of independent claim 1.

If groups of articles are moved horizontally into a defined position by push bars or other pushing means, or by means of movable support surfaces, depending on the speed of this movement, there is a certain risk that, upon reaching the final position, the articles will have moved relative to one another within the group. Under unfavourable circumstances, in particular in the event of a strong deceleration at the end of the pushing movement, some articles may even fall over. Generally, the greatest risk of falling over or slipping applies to the articles at the very front in the direction of movement, such that the previous configuration of the layer cannot be maintained as desired. For this reason, there are limitations on the pushing speeds that can be attained. In particular before reaching the desired final position, the speed may have to be moderately reduced in order to avoid abrupt slowing and the related risk of dissolution of the configuration of the layer. If a frame surrounding the articles is used to move them, other conveyor or handling elements, e.g. lifting gears, must wait until the frame has returned. Thus, form-fitting transfer cannot be used to increase the total output of a palletiser or the like.

DE 603 07 332 T2 discloses a device for transporting and packaging a group of objects that are held in a predetermined position during transport by means of a fixture device, such that the objects can be transported stably as a group. This is meant, in particular, to prevent the objects falling during their transport and transfer to another packaging unit.

A method for forming, affixing, separating, and transporting stacks behind a support device is also known from DE 41 17 434 A1. Several stack supports ensure the stability of the stacks, and, to this end, each follow the course of the movement of the stacks.

DE 44 35 981 A1 shows a device for supplying objects to be packaged to a packaging machine. The objects are transported along a conveyor line and transferred to the packaging machine by means of sliding devices.

One objective of the present invention is to provide a transfer unit for transporting and transferring groups or layers of articles in a specified formation that can be used universally and for various types of transported articles and allows for transfer of the groups or layers of articles at high transfer speeds without compromising the formation of the articles. In particular, the transfer unit should be usable for palletising and/or depalletising groups of articles in a specified formation.

The aforementioned objective is met by the subject-matter of independent claim 1. Additional advantageous embodiments are described by the dependent claims. Thus, to achieve the aforementioned objective, a transfer unit for horizontal movement of a group or layer of articles between at least two adjacent modules, whilst substantially maintaining the relative positions of a plurality of articles constituting the group or layer of articles to one another, is proposed. This transfer unit comprises a horizontal support surface that may optionally have a driven support level or be formed by an undriven sliding level for the layer of articles, at least one first bar or push bar contacting the rear side of the articles in the direction of transport or transfer for horizontal transport of the layer of articles to an adjacent module, as well as at least one second bar or support bar frontally contacting the layer of articles, which is at least temporarily coupled with the push bar for its movement in the direction of transfer. According to this invention, a first horizontal movement section of the first bar or push bar, which generates the horizontal pushing movement on the level of the layer of articles moving on the support surface, is longer than a second horizontal movement section of the second bar or support bar, which allows the range of movement of the push bar, e.g., to exceed the terminal edge of the support surface in the direction of transport or transfer, allowing it to transfer the layer of articles reliably and without interruption to a subsequent unit, e.g., a loading station. In this way, the first horizontal movement section of the first bar or push bar may extend beyond the terminal edge of the support surface for the layer of articles in the direction of transport or transfer in order to facilitate transfer to the module subsequent to the transfer unit.

Additionally, the first and second bars usefully each have separate, independently controllable drive systems with which the forward and/or return movements of the push and support bars can be controlled and specified either synchronously or asynchronously with, and independently of one another. In this way, the movement paths of different lengths for the bars, the forward movements of which must be coordinated, can be balanced out, such that, e.g., the push bar may execute a faster return movement in order to compensate for the longer path.

In a first variant of the transfer unit according to the invention, the drive system of the first bar or push bar is formed by a first, endlessly circulating pull drive above the horizontal support surface, running parallel to it in some sections, to generate the horizontal pushing movement at the level of the layer of articles moving on the support surface. Likewise, the drive system of the second bar or support bar may be formed by a second, endlessly circulating pull drive above the horizontal support surface, to generate the horizontal support movement at the level of the layer of articles moving on the support surface. In an alternative variant of the drive, the drive system of the second bar or support bar may also be formed by a pull or rod drive oscillating at least in some sections above the horizontal support surface, which may provide for the horizontal supporting movement at the level of the layer of articles moving on the support surface. A possible rod drive may be, e.g., a suitable linear drive or the like.

Generally, the push and support bars may be driven and suspended in different manners. Thus, for example, they may be moved, substantially synchronised in sections, by circulating chains or belts, whilst moving in their feed direction at the respective height of the articles to be moved or supported, whilst, in their return movements above and below the conveyor level of the layers of articles being transported, they may be moved against their transport direction. In order to allow for the independent movement control of the two bars, each of the two pull or rod drives has its own drive motor, which is generally an electric motor. Optionally, however, other drive or movement variants may also be used in order to engage or disengage the push bars with the layers of articles. Thus, the push bars may be inserted or withdrawn, e.g., perpendicularly to the feed direction, from the conveyor path of the layers of articles, optionally from above or below, or from the side. Combinations of the aforementioned movements and/or controls are also possible.

An advantageous variant in this regard may provide that the second bar or support bar forms an extension of the support surface at a terminal stop in the direction of transport or transfer. The second or support bar may drop to the level of the support surface and form a substantially gap-free extension of this support surface in order to close a gap between it and a subsequent module to which the layer of articles is transferred by the aforementioned transfer movement.

The transfer unit according to the invention may, in particular, be part of a palletisation device for palletisation by stacking layers of articles on top of one another in a stacking area downstream of the transfer unit. Preferably, an embodiment is conceivable in which the transfer unit according to the invention is located immediately upstream of a loading station, e.g., a jalousie gripper or similar. The vertically movable transfer unit transferring the layers of articles at different heights may be located downstream of a grouping system from which the layers of articles formed and grouped out of individual articles can be transferred horizontally to the transfer unit that is at the same height. The layers of articles formed and grouped out of individual articles may be raised and/or lowered to the height of the loading station by means of the vertically movable transfer unit, and can be transferred to the loading station once the transfer unit and the loading station are at the same height.

The transfer unit according to the invention may be, e.g., part of a palletisation or depalletisation system, and be suspended on a hoisting column or the like, in order to carry out the vertical movements. There may be, in particular, a grouping station upstream of the transfer unit, in which the articles are grouped into flat layers that are transferred to the transfer unit and, from there, to a subsequent unit with which they may, e.g., be palletised. The unit downstream of the vertically movable transfer unit may be, e.g., a loading station or the like that is also vertically movable, by means of which the layers of articles may be deposited on top of one another in a stacking area such as a pallet.

This invention further comprises a method for horizontal movement of a group or layer of articles into or out of a transfer unit according to one of the aforementioned embodiments. During this horizontal movement, the group or layer of articles is transferred by means of at least one first bar or push bar contacting the articles at the rear of the group or layer of articles in the direction of transport or feeding into a second resting position whilst substantially maintaining the relative positions of a plurality of articles forming the group or layer, whilst simultaneously a second or support bar, at least temporarily associated with the articles in the front in the direction of transport, moves ahead of, or abuts, the layer or group of articles at a slight distance, constantly or at least shortly before or upon reaching the resting position. In the method according to the invention, the movements of the first bar and the second bar are each controlled and/or regulated independently of one another. In this regard, it should be clarified that the feeding and traversing movements of the push bar and support bar may generally be independent of one another, but that this is not advantageous at all times in the context of this invention because the feeding movements should be synchronised at least in sections in order to stabilise the layer of articles. These nearly synchronised movements are required in particular during a slowing phase of the layer of articles during transfer and/or shortly before the layer of articles stop, but not in the other movement sections. No synchronised movement is required here; thus, the two bars generally move independently. Additionally, the second bar or support bar, the movements of which are coupled with the first bar or push bar contacting the rear of the layer of articles, may, at least in a specific phase during, in particular at the end of the transfer movement, be in contact with the front of the layer of articles or at a slight distance from the front, and move ahead of the group or layer of articles whilst in contact with it or at a slight distance from it.

In the transfer unit according to the invention and the method for horizontal movement of the layers of articles, the first or push bar contacts the articles at the rear of the layer of articles in the direction of transport or feed, thus pushing the entire layer, which is advantageously guided laterally in this section, in order to prevent the dissolution of the article formation due to individual articles breaking loose laterally. By the action of the push bar in the rear and the lateral guides, relative positions of a plurality of articles forming the group of articles can be substantially maintained relative to one another, i.e., the configuration of the article group moved remains substantially intact. The transfer unit additionally comprises a second or support bar, which is at least temporarily associated with the foremost articles in the direction of feed, and which continuously—or at least briefly before or upon reaching the resting position—runs slightly ahead of the front articles or abuts them. The control of the second or support bar, depending on the movements of the layer of articles, comprises both a movement control, in which the support bar moves slightly ahead of the layer of articles, and a movement control, in which the support bar abuts the group of articles at least shortly before or upon reaching the resting position, thus contacting and stabilising them at least during the last phase of the braking process. Additionally, the invention comprises a further movement control variant, in which the support bar stabilises the group or layer of articles initially during the deceleration process, but removes itself from the group or layer of articles immediately before coming to a stop. This can be related to the fact that the deceleration of the group or layer of articles does not occur smoothly, instead gradually becoming gentler shortly before reaching the resting position, in order to prevent a sudden, jerky stop of the group or layer of articles. In such a gentle stopping procedure, which may be preceded by a deceleration phase with substantial slowing from a higher transport speed, there is no need for the group of articles to be in contact with the support bar immediately before stopping, such that it can already be removed from the group by accelerated movement. In the manner described, it is possible to prevent the foremost articles of the article group from shifting or falling over when the group or layer of articles is slowed or stops, in particular upon reaching a target position of the article group. Generally, the individual articles of the article group moved are not only subject to destabilisation when the transfer speed is reduced. During acceleration, too, as well as during transfer from the one conveyor unit of the module to the conveyor unit of the subsequent module, high transfer speeds, as well as the transitions between the two conveyors, may cause individual articles to slip or fall over; the movement control according to the invention for the support bar moving ahead of and/or abutting the article group is meant to prevent this.

Because the push bar typically moves the group of articles relative to a support level on which the articles slide, there is constant dynamic friction between the support surfaces for the articles and the support level, which generates constant frictional resistance between the sliding surfaces. For this reason, abrupt slowing of the group of articles may result in individual articles falling over or shifting relative to the adjacent articles, which can be reliably prevented by the support bar positioned at the front of the group of articles. Optionally, the transfer unit or the modules between which the articles are moved may have their own drives and driven support surfaces, e.g., by means of mat conveyors or the like, such that the transfer movements of the articles are supported. In undriven modules—e.g., transfer systems or transfer tables, or similar transport and/or hoist elements—it is advantageous for the support levels on which the articles are moved to be as low in friction as possible. Thus wooden or plastic panels may be used for these support levels, which may have longitudinal contouring in the form of paths, ribs, or grooves. It would also be possible for the support surface to consist of a combination of the aforementioned wooden, plastic, and/or metal materials. Additionally, suitable coatings may be provided in order to provide the support surface with different friction coefficients over its course in the direction of transfer.

By such a nearly form-fitting transfer of a layer of articles or a formatted group of articles from one station to another, subsequent station, the transfer unit according to the invention and the method for controlling it allows for rapid slowing, but can also stabilise the layer of articles during the other phases of a transfer movement, because a retaining bar or stop moving along with the feed movements of the layer of articles can secure the layer. A layer of articles, bundles, or containers can be transferred without the risk of bundles or containers falling over. This also allows for substantial reduction of transfer times. After transfer, other axles (e.g., hoist elements) need not wait, e.g., until a frame is returned in order to release the other axles (e.g., hoists).

The second push bar, which, at least in phases, simultaneously with the push bar engaging at the rear, in particular at the end of the transfer movement, contacts the front (in the direction of transfer or feed of the articles), and can be considered a braking or support bar, may optionally be applied to the front of the group of articles or brought to a small distance from the front, such that it moves ahead of the group of articles whilst in contact with them or at a slight distance from them and thus allows for a high transfer speed and rapid deceleration of the group of articles without any risk of dissolution of the article formation due to individual articles falling or slipping. Generally, it can suffice for the second bar or support bar to be brought into contact with the front articles only at the end of the transfer movement, in particular when the group of articles slows down to a stop, because it is substantially only in this phase that the front row tends to fall over in the direction of transport, whilst the phases of the transfer movement that maintain nearly constant transfer speed cause no problems. As noted above, this applies at least to the phase with constant transfer speed. However, if the layer of articles is subject to pronounced accelerations and decelerations during the transfer movements, the support bar may be required during the transfer movement to stabilise the group of articles, in particular during high-deceleration phases. Because such deceleration phases precede the braking of the group of articles until immediately before a stop, individual articles may already slip or fall over during these phases, which can be reliably prevented by the support bar abutting (or moving slightly ahead of) the foremost articles in the direction of transport. In such movement patterns, it may suffice for the support bar only to be used in these specified phases of greater deceleration, such that it can remove itself from the articles during a slight deceleration in the final phase.

Nearly synchronised movements of the two bars at least during the deceleration of the group of articles may ensure that the stability of the article formation may be maintained with the desired reliability. Generally, the method according to the invention may be used for any movement of groups or layers of articles or the like, e.g., for palletising or depalletising such layers or groups of articles, whereby the respective previous article formation or the existing configuration of the layer is maintained to the greatest possible extent.

The transfer unit may generally be arranged between all conceivable types and variants of modules to be connected in transport flows within handling and/or packaging machines, conveyor units, etc. Thus, overall layer configurations or layers of articles may be transferred from one conveyor device, e.g., a horizontal mat conveyor or the like, into the transfer unit operating as a hoisting or repositioning device, and from there to a jalousie gripper head that can stack the layers of articles, e.g., for multi-layer palletisation.

The at least two push and support bars movable parallel to the direction of transport of the groups or layers of articles may move, as necessary, within specified movement spaces, which may optionally extend via interfaces between adjacent modules. Thus, if necessary, the first, rear bar or push bar pushing the articles may, according to an advantageous embodiment, move at least a short distance via a conveyor into the module into which the layer of articles is being pushed. This may be, e.g., the aforementioned hoisting and/or repositioning system or jalousie gripper head, etc. This transport module must be prepared appropriately in order to receive the push bar for at least a short time until the transferred layer of articles has come to a stop and no more articles are being decelerated and thus susceptible to tipping or slipping. In order to allow for this range of motion for the push bar, it, or its guides, may optionally be part of the second module, i.e., the hoisting and/or repositioning system or jalousie gripper head. Because such an embodiment involves a relatively complex design, a more preferred embodiment provides for the guides responsible for driving and controlling the movements of the first bar or push bar to reach into the second module at least during the transfer, which may be achieved, e.g., by an appropriate rod or linear drive, etc. An appropriate movement control is not required for the second bar or support bar braking the layer or group of articles from the front, because this function is normally performed by the support bar of the module into which the layer of articles is pushed.

When articles or layers of articles are referred to in this regard, this may generally refer to widely varied packaged goods, e.g., individual cartons, beverage containers such as bottles, cans, or beverage cartons, piece foods, etc. that can be palletised, stacked, or depalletised in specified configurations. Articles may also include bundles, e.g., film-wrapped or strapped bundles, etc.

Exemplary embodiments of the invention and its benefits will be discussed in greater detail below by reference to the attached drawings. The size ratios of the individual elements to one another in the drawings do not always correspond to the actual scale, because some shapes are simplified and others are enlarged relative to other elements for ease of illustration.

FIG. 1 shows two schematic views of the beginning of a movement transferring a layer of articles from one module to an adjacent second module.

FIG. 2 shows two views of the completed transfer movement of FIG. 1.

FIG. 3 shows two schematic views of a movement transferring a layer of articles from one module to an adjacent second module according to the invention.

FIG. 4 shows the further course of the transfer movement begun in FIG. 3.

FIGS. 5-9 show schematic views of consecutive steps of the transfer of a layer of articles between three adjacent modules.

FIG. 10 shows a schematic side view of an embodiment of a transfer unit according to the invention.

FIG. 11 shows a schematic top view of an embodiment of a transfer unit according to FIG. 10.

FIG. 12 shows two perspective views of the transfer unit according to FIG. 10.

Figure 9E:
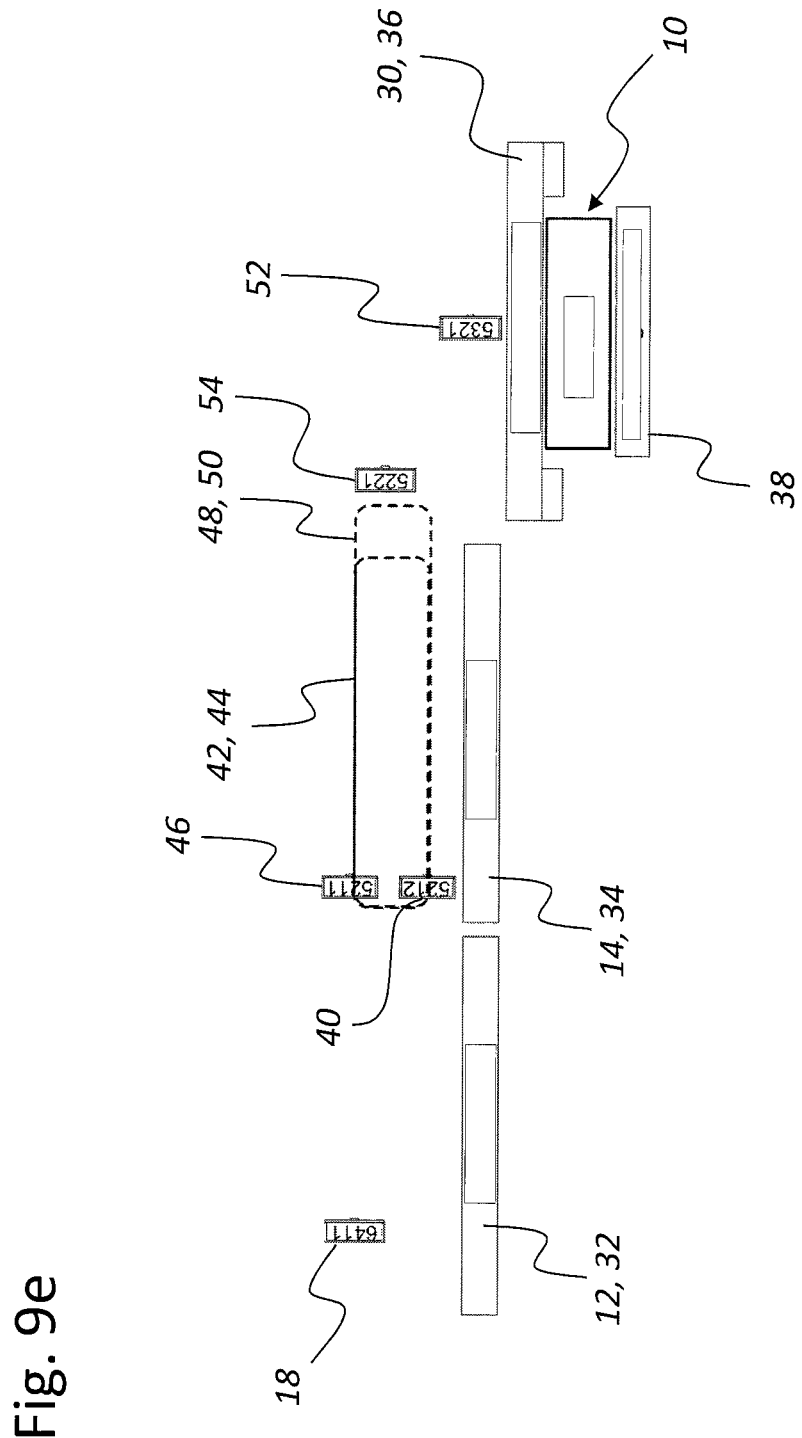

Identical reference numerals are used to designate the same or functionally similar elements of the invention. Additionally, for ease of reference, only reference numerals required for the description of the respective drawing are included in each drawing. The embodiments shown are merely examples of possible configurations of the device or method according to the invention and are in no way intended as limitations thereof.

FIG. 1 shows a schematic top view (FIG. 1a) and a schematic side view (FIG. 1b) of a horizontal movement of a group or layer of articles 10 from a first position from a first module 12, e.g., a grouping table that may be part of a grouping system, into a second position on a second module 14, which may be a hoisting module, a loading station, or a transfer unit (cf. FIG. 5 et seq.) etc. In the exemplary embodiment shown, the layer of articles 10 comprises a regular configuration of a plurality of articles 16 in a rectangular group, to be transferred by means of a push bar 18 from the first module 12 to the second module 14 without changing the configuration. The articles 16 may be, e.g., cartons, bundles of several individual articles or containers, or individual containers standing adjacent to one another in a regular configuration. Normally, the articles 16 have a height greater than the lateral edge of their base surface, such that they tend to tip in the event of sudden accelerations or decelerations. Even when this is not the case, i.e., for articles 16 with a relatively small height, high accelerations, high transfer speeds, and sudden decelerations during transfer of the layer from one module to the following module, the bundles or articles 16 may drift apart or slip due to the transitions.

The push bar 18 responsible for pushing the group or layer of articles 10 contacts the articles 16 in the rear of the group 10 in the direction of transport or feed 20, and thus moves the entire group or layer of articles 10, which may move laterally in order to maintain the layer configuration. The optional lateral guides are indicated with the reference numeral 17 in FIGS. 1a and 2a. By the action of the push bar 18 in the rear and the lateral guides 17 arranged on either side of the transfer path, relative positions of a plurality of articles 16 forming the group of articles 10 can be substantially maintained relative to one another, i.e., the configuration of the article group 10 moved remains substantially intact along the forward movement 20.

In the following figures, the lateral guides 17 are omitted for ease of reference; however, this does not mean that the guides are not present.

As illustrated by the two schematic representations of FIG. 2 with the top view of FIG. 2a and the side view of FIG. 2b, the forward movement 20 does not occur at constant speed because the pushing movement 22 of the push bar 18 gradually slows at least shortly before reaching the target position of the layer of articles 10 on the second module 14 in order to avoid sudden stops. There is nonetheless the risk that some of the foremost articles 16 of the article group 10 slip or fall over when the group or layer of articles 10 rapidly decelerates or suddenly stops, in particular upon reaching a target position of the article group 10. Because the push bar 18 typically moves the group of articles 10 relative to a support level 24 of the first and/or second module 12, 14 on which the articles 16 slide, there is constant dynamic friction between the bottoms of the articles 16 and the support level 24, which generates constant frictional resistance between the sliding surfaces. For this reason, abrupt slowing of the layer of articles 10 may result in individual articles 16 falling over or moving relative to the adjacent articles 16, which this invention is intended to prevent.

Thus, FIGS. 3 and 4 are schematic top (FIGS. 3a and 4a) and side views (FIGS. 3b and 4b) illustrating an essential aspect of this invention, which provides that a support bar 26 of the layer of articles 10 associated at least temporarily with the articles 16 in the front in the direction of transport runs slightly ahead of or abuts the foremost articles 16 of the layer of articles 10 at least shortly before reaching the resting position on the second module 14. Optionally, the support bar 26 may be moved parallel to the feed movement 20 between two terminal positions in the area of the second module 14 such that the pushing movement 28 of the support bar 26 is at least temporarily parallel to, and in the same direction as, the movement 20 of the layer of articles 10 and the pushing movement 22 of the push bar 18. In order to prevent the foremost articles 16 of the layer of articles 10 being moved relative to the other articles 16 or the specified configuration or tipping, this pushing movement 28 of the support bar 26 must be nearly synchronised with the pushing movement 22 of the push bar 18 at least in phases in which the layer of articles 10 is subject to rapid deceleration and/or the final phase of the transfer movement, in particular in a braking or deceleration phase of the layer of articles 10, when it is decelerated and comes to a stop. As noted above, depending on the course of the feed movement 20 of the layer of articles 10, the support bar 26 may also be removed early in the direction indicated by the arrow 28 from the layer of articles 10 and accelerated before the layer of articles 10 comes to a stop. In such a movement control, the support 26 bar stabilises the group or layer of articles 10 initially during the deceleration process, but can remove itself from the group or layer of articles 10 immediately before coming to a stop. This can be related to the fact that the deceleration of the group or layer of articles 10 is not even, and instead gradually becomes gentler shortly before reaching the resting position in order to prevent sudden, jerky stops of the group or layer of articles 10. In such a gentle stop, which may be preceded by a deceleration phase with substantial deceleration from a higher transport speed, there is no need for the layer of articles 10 to be in contact with the support bar 26 immediately before stopping, such that it can already be removed from the layer 10 when the movement accelerates 28 again.

As shown schematically in FIGS. 3 and 4, the method according to the invention, by means of the nearly form-fitting transfer of a layer 10 of articles 16 from one station (module 12) to an adjacent station (module 14) shown, allows for very fast transfer and feed movements 20 and subsequent relatively rapid decelerations, because the retaining or support bar 26 moving along with the feed movements 20 of the layer of articles 10 secures and stabilises the layer 10. Here, too, lateral guides for the layer of articles 10 are useful, even if not included in the drawings. Generally, it can suffice for the second push bar or support bar 26 to be brought into contact with the front articles 16 (cf. FIGS. 4*a* and 4*b*) only at the end of the transfer movement, in particular when the layer of articles 10 slows down to a stop, because it is substantially only in this phase that the front row tends to fall over in the direction of transport.

The schematic views of FIGS. 5-9 illustrate in a total of twenty three individual representations the consecutive steps of transferring a layer of articles 10 between three adjacent modules 12, 14, and 30. In this exemplary embodiment, the first module 12 respectively shown on the left consists of a grouping system 32 that receives a layer of articles 10 in a specified formation from an upstream sorting system (not shown here). Such a sorting system may comprise, e.g., one or more handling robots forming cohesive layers 10 out of one or more article flows transferred, as shown, to the first module 12 or the grouping system 32. The height and lateral position of the grouping system 32 need not be adjustable; rather, the system 32 may be fixed, as also shown in FIGS. 5-9. Optionally, however, the grouping system 32 may also be adjustable in height, in particular with optional omission of the transfer unit 34 (or transfer table) that constitutes the second module 14 downstream of the grouping system 32. In such a configuration, the adjustable-height grouping system 32 may be prepared for direct transfer of the layers of articles 10 to the loading station 36 constituting the third module 30. In this case, the first and second bars 46 and 40, normally associated with the transfer system 34, are associated with the grouping system 32, and their movements must be controlled appropriately so as to allow for the omission of the transfer system 34 without functional limitations.

FIG. 5*a* shows a layer of articles 10 on the first module 12, the grouping system 32, which can be moved to the right onto a second module 14 at the same height by means of a horizontally movable push bar 18, as shown in FIG. 5*b*. In the exemplary embodiment shown, the second module is a transfer table or the transfer unit 34, which is formed so that its height is adjustable in order to allow for transfer to the loading station 36 located below the grouping system 32. In the exemplary embodiment shown, this loading station 36, the height of which can be adjusted depending on the loaded or unloaded state of a pallet segment 38 arranged below it, is the third module 30. As illustrated in FIGS. 5*a*-5*e*, the layer of articles 10 is transferred horizontally to the right from the first module 12 or grouping system 32 onto the second module 14 or transfer unit 34 by means of the push bar 18 associated with the first module 12 and arranged on the far left, whereby a support bar 40 associated with the transfer unit 34—also referred to as the second bar 40—stabilises the foremost articles of the layer of articles 10 and prevents individual articles slipping or tipping. The second bar or support bar 40 moves over nearly the entire length of the second module 14 or transfer unit 34, as illustrated by FIGS. 5*b*-5*e*. FIG. 5*d* additionally shows a particular feature of this embodiment in which the push bar 18 associated with the first module 12 is pushed beyond the grouping system 32 onto the edge of the transfer table 34 before being retracted according to FIG. 5*e* (cf. FIG. 6) in order to transfer another layer of articles 10 from the first module 12 or grouping system 32 onto the second module 14 or transfer unit 34.

In FIGS. 5*a*-5*e*, the second bar or support bar 40 associated with the transfer table 34 horizontally to the right until the layer of articles 10 according to FIGS. 6*a* and 6*b* is completely transferred onto the transfer unit 34 or the second module 14. FIG. 6*e* shows the subsequent vertical movement of the support bar 40, which is raised in order to avoid obstructing the further transfer of the layer of articles 10. The support bar or second bar 40 moves along a second, closed path 42, which may be specified in particular, by an appropriate second pull drive 44. FIG. 6*d* illustrates the return movement of the second bar or support bar 40 to the left above the layer of articles 10, which continues, as shown in FIGS. 7*a* and 7*b*, until the initial position in which the support bar 40 can be used to stabilise another layer of articles 10 is reached, as shown in FIGS. 7*c* and 7*d*.

Additionally, FIGS. 5*a*-5*e* illustrates the movement of a first bar 46 or push bar 46 associated with the transfer unit 34 above the layer of articles 10 along a first path 48, substantial sections of which may overlap with the second path 42, but has a first pull drive 50 independent of it, because a course that deviates in some sections from the second path 42 is necessary. Thus, FIGS. 7*b*, 7*c*, and 7*d* illustrate a path of the first bar 46 or push bar extending beyond the length of the transfer unit 34 and partially into the area of the loading station 36 of the third module 30. This extended path of the first push bar 46 allows transfer to the layer of articles 10 in one pulling movement from the second module 14 to the third module 30 without a need for interruptions in the transfer movement.

During the further transfer of the layer of articles 10 on the transfer unit 34 by means of the push bar 46 and the second bar or support bar 40 stabilising the layer of articles 10, the transfer unit 34 is lowered (cf. FIGS. 6*b*-6*d*) until the lower level of the loading station 36 is reached (FIG. 6*d*) such that the layer of articles 10 can be transferred (cf. FIGS. 7*a*-7*c*) to the right onto the loading station 36 by means of the push bar 46 (FIG. 6*d*). Another support bar 52, associated with this loading station 36, which, in at least some sections, moves simultaneously with the push bar 46 to the right whilst moving ahead of the article layer 10, stabilises the layer of articles 10 there and prevents tipping or slipping of individual articles. After contacting the layer of articles (FIG. 7*b*), it moves ahead of the layer of articles 10 as it is transferred to the right (FIG. 7*c*) until the push bar 46 has ended its transfer movement and is moved vertically upward (FIG. 7*d*) in the area of the loading station 36 along the first path 48.

Whilst the transfer unit 34 can be moved vertically upward (FIG. 8*a*, FIG. 8*b*) after transferring the layer of articles 10 to the loading station 36, a third push bar 54 associated with the loading station 36 moves vertically downward (FIG. 8*b*) to the level of the layer of articles 10 (FIG. 8*c*), and is then moved to the right (FIG. 8*d*) in order to centre the layer of articles 10 on the loading station 36 (FIG. 83), whereby the additional support bar 52 simultaneously ensures the stabilisation of the layer of articles 10. After correct placement of the layer of articles 10 (cf. FIG. 8*e*), it is lowered to the pallet segment 38 (FIG. 9*a*), after which the loading station 36 is raised again (FIG. 9*b*, FIG. 9*c*). Such a transfer of the layer of articles 10 may occur, e.g., by means of a jalousie or plate gripper head that can unload a complete layer of articles 10 downward by opening or lateral movement of its moveable bottom.

Meanwhile, the first bar or push bar 46 associated with the transfer table 34 resumes moving left along the first path 48 to the starting point, whereby it is moved above the level of the layer of articles 10 during the return movement in order to avoid collision. The other support bar 52 of the loading station 36 is also moved horizontally to the left (FIG. 9*c*) in order to stabilise another layer of articles 10 whilst the third push bar 54 is moved vertically upward (FIG. 9*d*) in order to allow a layer of articles 10 moving below it to pass.

It should be noted here that other courses and combinations of the transfer movements shown in FIGS. 5-8 with the same or similar interacting modules 12, 14, and 30 are possible without the principle of the transfer movement of cohesive layers of articles 10 being fundamentally modified. It should additionally be emphasised that the course of the transfer unit 34 described above from the higher grouping system 32 to the lower loading station 36 is by no means limiting, and is offered by way of example only. Thus, there may be multiple layers of articles 10 stacked on top of one another in the stacking area of the pallet segment 38 after multiple transfers, such that it may be necessary to transfer another layer of articles 10 from the grouping system 32 to the loading station 36 by raising the transfer unit 34 after receiving it. In this case—not shown here—the transfer unit 34 is not lowered, as in FIGS. 6b, 6c, and 6d, with the layer of articles 10 on it to the level of the loading station 36, but rather, if necessary, to a level of a highest layer of articles 10 lying on it.

Another variant of the stapling method, not shown here, may optionally provide for several layers of articles 10 to be deposited simultaneously on the loading station 36. By simultaneous handling and stacking of several layers of articles 10, pallet changing times can be significantly reduced. This allows the loading station 36 to act as intermediate storage, allowing the necessary time for pallet changes to be minimised.

FIGS. 10-12 show various schematic views of one embodiment of the adjustable-height transfer unit 34 according to the invention, which has a frame 56 with connectors 58 arranged to the side of and/or below the frame 56 for connection with a hoist unit or traverse (not shown) as well as a support level 24 for horizontal movement of layers of articles between the two rail-like lateral guides 17. The support level 24 may have plates 60, which may consist, e.g., of wood, plastic, or another low-roughness material. In the exemplary embodiment shown, three such plates 60 are attached to one another, whereby the lateral guides 17 are attached with brackets protruding from the joints of joined plates 60 upward through the support level 24. The frame 56 has lateral wall elements 62, which serve to anchor the plates 60 of the support level 24 and as mounts for the pull drives 44 and 50.

As can be seen in FIGS. 10 and 12, the first path 48, described by the first pull drive 50 with the first bar 46 or push bar, extends slightly beyond the length of the support level 24. A first, lower redirection 64 of the first path 48 is displaced forward compared to a second, lower redirection 66 of the second path 42 with the second pull drive 44 in the direction of transport 20 of the layers of articles, such that the distance of the two deflections 64 and 66 defines the differences in length of the horizontal movement sections of the two paths 48 and 42. The lower rear redirections 68 of the two paths 48 and 42, on the other hand, are aligned with one another and have the same axis, like the upper, rear redirections 70 and the upper, front redirections 72, because the corresponding guide pulleys of the two pull drives 44 and 50 are each square to the other. With the second pull drive 44, the support bar 40 is moved, which, in the exemplary embodiment shown, is near the lower, rear redirection 68 and thus in the ready position for receiving a layer of articles from an upstream module of the system, as shown, e.g., in FIG. 8a. The push bar 46 is simultaneously near the upper, front redirection 72, where it is moved out of the engagement range of a layer of articles to be transferred.

Whilst the lower redirections 64, 66, and 68 each have separate pulleys 76 mounted rotatably in the wall elements 62 to guide the hoist chains 74 of the two pull drives 44 and 50, the pulleys 76 of the upper redirections 70 and 72 mounted in the wall elements 62 on either side are coupled with one another via rear and front drive shafts 78 and 80 such that one of the two drive shafts 78 or 80 is coupled with the first pull drive 50, whilst the respective other drive shaft 80 or 78 is coupled with the second pull drive 44. Each of the two drive shafts 78 and 80 is associated with a separate electrical drive motor 82, thus allowing various speeds to be applied to the drive shafts 78 and 80, allowing the two bars 40 and 46 to be controlled independently of one another.

Other alternative embodiments, not shown here, are also possible. Thus, the two drive motors 82 need not necessarily be mounted at a spatial difference from one another on the frame 56. Instead of the two drive shafts 78 and 80, a dual-action hollow shaft can also be used that can be made to rotate with two coaxial drive shafts via a suitable drive motor, thus also providing for the independence of the pull drives for the support and push bars 40 and 46. As noted above, instead of the endlessly circulating second pull drive 44, an oscillating path, which may also extend below the support level 24, may also be provided for the support bar 40. In this regard, it may also be advantageous to use the support bar 40, appropriately configured, temporarily as an extension of the support level 24 on its front end, approximately below the first lower redirection 64, such that a gap between the support level 24 and the subsequent module to which the layer of articles is transferred can be substantially closed.

The invention was described by reference to a preferred embodiment. However, persons skilled in the art will be aware that variations and modifications of the invention can be made without leaving the scope of the claims below.

REFERENCE NUMERALS

10 Layer or group of articles
12 First module
14 Second module
16 Articles, bundles, containers
17 Lateral guide
18 Push bar
20 Feed, forward movement
22 Pushing movement (push bar)
24 Support level
26 Support bar
27 Push bar
28 Pushing movement (support bar)
30 Third module
32 Grouping table, grouping system
34 Transfer unit, transfer table
36 Loading station
38 Pallet segment
40 Support bar, second bar
42 second path
44 Second pull drive
46 First bar, push bar
48 First path
50 First pull drive
52 Additional support bar
54 Third push bar
56 Frame
58 Connector
60 Plates
62 Wall element
64 First lower redirection
66 second lower redirection
68 Rear lower redirection
70 Rear upper redirection 72 Front upper redirection
74 Hoist chain
76 Pulleys
78 Rear drive shaft
80 Front drive shaft
82 Drive motor

The invention claimed is:

1. Transfer (34) unit for horizontal movement of a group or layer of articles (10) between at least two adjacent modules (12, 14, 30) whilst substantially maintaining the relative positions of a plurality of articles (16) constituting the group or layer of articles (10), comprising: a horizontal support surface (24) for the layer of articles (10) that is connected to the transfer unit (34); at least one first bar (46) or push bar coupled to a first drive system, the at least one first bar (46) or push bar positioned to touch the articles from behind in a conveyance or transfer direction, the first drive system comprising a first electric motor, the first drive system configured to cause the at least one first bar (46) to horizontally move the layer of articles (10) to an adjacent module (14, 30) via a transfer having a constant speed phase whereby the layer of articles (10) are moved at a constant speed and a deceleration phase whereby the layer of articles (10) are slowed to a stop; and at least one second bar (40) or support bar coupled to a second drive system comprising a second electric motor that can be controlled independently of the first drive system, the at least one second bar (40) or support bar positioned to contact the front of the layer of articles (10) during the constant speed phase of the transfer, wherein the second drive system is configured to separate the at least one second bar (40) or support bar from the front of the layer of articles (10) during the deceleration phase of the layer of articles (10), after the deceleration of the layer of articles (10) has commenced and prior to the stop of the layer of articles (10).

2. Transfer unit according to claim 1, in which the first drive system of the first bar (46) or push bar further comprises a first, endlessly circulating pull drive (50) above the horizontal support surface (24), running parallel to it in some sections including a first horizontal section, to generate the horizontal pushing movement at the level of the layer of articles (10) moving on the support surface (24).

3. Transfer unit according to claim 2, in which the first horizontal section of the movement of the first bar (46) or push bar extends beyond a terminal edge of the support surface (24) for the layer of articles (10) in the direction of transport or transfer.

4. Transfer unit according to claim 1, in which the second drive system of the second bar (40) or support bar further comprises a second, endlessly circulating pull drive (44) above the horizontal support surface (24), to generate the horizontal support movement at the level of the layer of articles (10) moving on the support surface (24).

5. Transfer unit according to claim 1, which is part of a palletisation device for palletisation by stacking layers of articles (10) on top of one another in a stacking area downstream of the transfer unit (34), wherein the vertically movable transfer unit (34) transferring the layers of articles (10) at different heights is downstream of a grouping system (32) from which the layers of articles (10) formed and grouped out of individual articles (16) can be transferred horizontally to the transfer unit (34) that is raised to the same height.

6. The transfer unit according to claim 1, wherein the adjacent modules (12, 14, 30) have undriven support surfaces.

7. Method for horizontal movement of a group or layer of articles (10) via a transfer unit (34) to transfer the group or layer of articles (10) between at least two adjacent modules (12, 14, 30) whilst substantially maintaining the relative positions of a plurality of articles (16) comprising the group or layer of articles (10), the method comprising: contacting, by means of at least one first bar (46) or push bar, the hindmost articles (16) from behind in the direction of transport or feed (20), pushing with the first bar (46), the group or layer of articles (10) on a support surface (24) of the transfer unit (34) at a constant speed during a constant speed phase of the transfer, contacting with a second bar (40) or support bar, the front of the layer of articles (10) during the constant-speed phase of the transport; decelerating, with the first bar (46), the movement of the group or layer of articles (10) during a deceleration phase of the transfer; and separating the second bar (40) from the group or layer of articles (10) during the deceleration phase, after the deceleration of the group or layer of articles (10) has commenced and prior to the stop of the group or layer of articles (10).

8. The method according to claim 7, further comprising positioning the first bar (46) to contact the hindmost articles (16) of the group or layer of articles (10) by an endlessly circulating pull drive (50) coupled to the first bar (46).

9. The method according to claim 7, further comprising positioning the second bar (40) to contact the front of the group or layer of articles (10) by an endlessly circulating pull drive (44) coupled to the second bar (40).

10. The method according to claim 7, further comprising vertically moving the transfer unit (34) between the heights of an adjacent stacking area downstream of the transfer unit (34) and a grouping system (32) upstream of the transfer unit (34).

* * * * *